United States Patent [19]

Tanaka et al.

[11] Patent Number: 4,499,465

[45] Date of Patent: Feb. 12, 1985

[54] CAPACITIVE-TYPE INCREMENTAL AND REFERENCE ANGULAR ROTATION DETECTING APPARATUS

[75] Inventors: Hiroaki Tanaka; Shigeyuki Akita, both of Okazaki, Japan

[73] Assignee: Nippon Soken, Inc., Nishio, Japan

[21] Appl. No.: 358,903

[22] Filed: Mar. 17, 1982

[30] Foreign Application Priority Data

| | | |
|---|---|---|
| Mar. 18, 1981 [JP] | Japan | 56-40051 |
| May 25, 1981 [JP] | Japan | 56-78872 |
| May 27, 1981 [JP] | Japan | 56-80585 |
| Jun. 5, 1981 [JP] | Japan | 56-86507 |

[51] Int. Cl.³ ............................................. G08C 19/10
[52] U.S. Cl. .................................. 340/870.37; 318/662
[58] Field of Search ........................... 324/61 R, 166; 340/870.37; 318/662

[56] References Cited

U.S. PATENT DOCUMENTS

| | | | |
|---|---|---|---|
| 3,222,668 | 12/1965 | Lippel . | |
| 3,702,467 | 11/1972 | Melnyk . | |
| 3,760,392 | 9/1973 | Stich . | |
| 3,845,377 | 10/1974 | Shimotori | 324/61 R |
| 3,873,916 | 3/1975 | Sterki . | |
| 3,938,113 | 2/1976 | Dobson et al. . | |
| 3,961,318 | 6/1976 | Farrand et al. . | |
| 4,092,579 | 5/1978 | Welt . | |
| 4,199,800 | 4/1980 | Weit . | |
| 4,238,781 | 12/1980 | Vercelloti | 340/870.37 |
| 4,350,981 | 9/1982 | Tanaka et al. . | |
| 4,418,347 | 11/1983 | Tanaka et al. . | |
| 4,418,348 | 11/1983 | Tanaka et al. . | |
| 4,423,417 | 12/1983 | Tanaka et al. . | |

*Primary Examiner*—Stanley T. Krawczewicz
*Assistant Examiner*—Jose M. Solis
*Attorney, Agent, or Firm*—Cushman, Darby & Cushman

[57] ABSTRACT

There is provided a capacity type rotation detecting apparatus which comprises a first insulating circular plate having on one surface thereof at least one pair of sets of electrode pieces arranged circumferentially and connected electrically to one another and at least one ring-shaped electrode, a second insulating circular plate having on one surface thereof at least one set of electrode pieces arranged circumferentially to face the at least one pair of sets of electrode pieces on the first insulating circular plate and connected electrically to one another and at least one ring-shaped electrode arranged to face the at least one ring-shaped electrode on the first plate and connected electrically to the at least one set of electrode pieces on said second plate, and a periodic signal supply circuit for applying periodic signals of opposite phase to the at least one pair of electrode-piece sets, respectively, on the first insulating circular plate, whereby, when the first and second insulating circular plates are placed facing each other and rotated relative to each other, the phase relation between the periodic signals transmitted to the at least one ring-shaped electrode on the first insulating circular plate through the capacitance formed between the opposite electrodes of the first and second plates and the periodic signals from the periodic signal supply circuit is detected and a rotational position signal and a reference angular position signal are generated simultaneously in accordance with the results of the phase detection.

4 Claims, 91 Drawing Figures

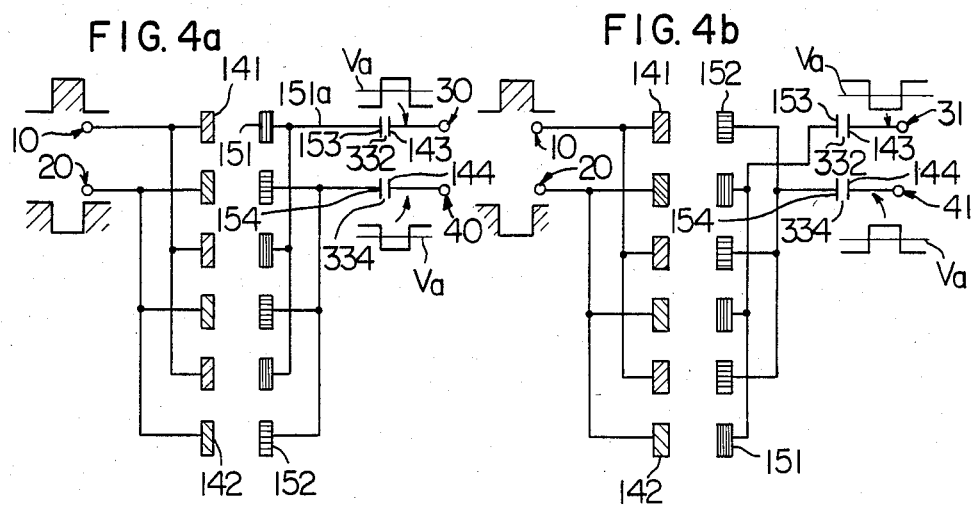
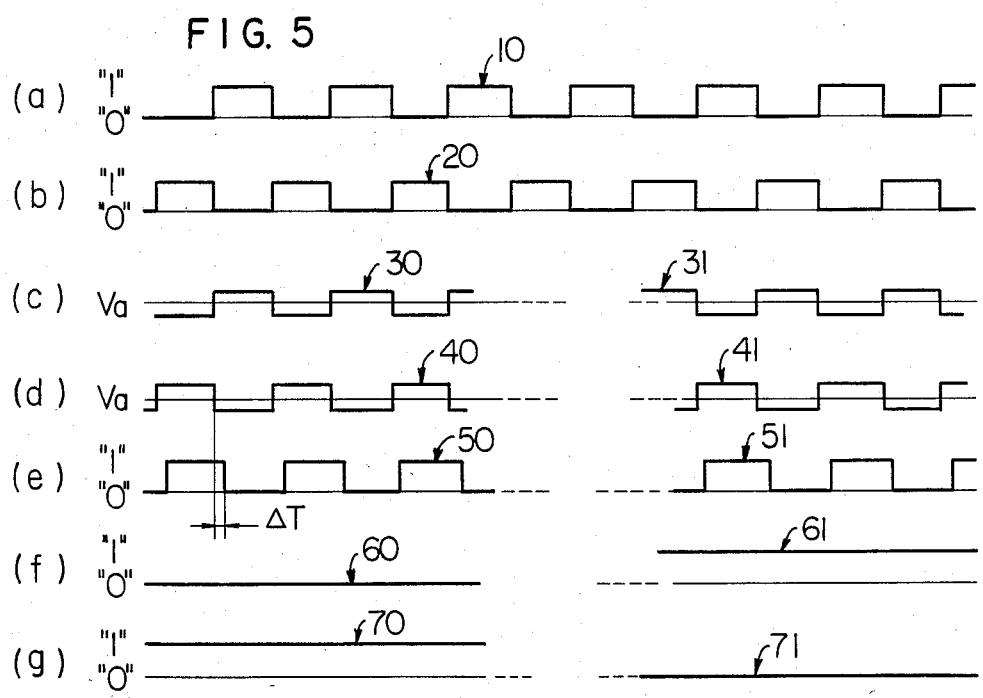
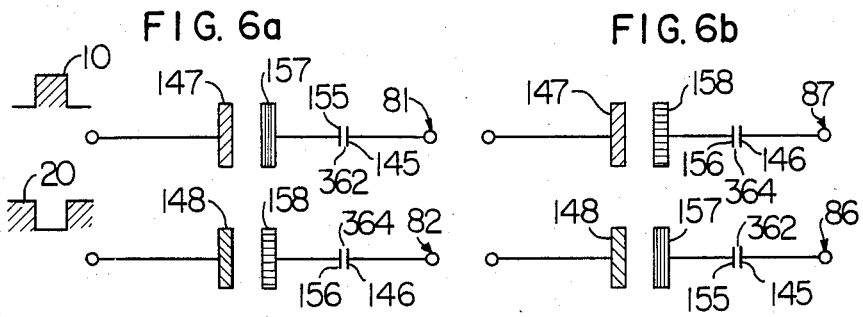

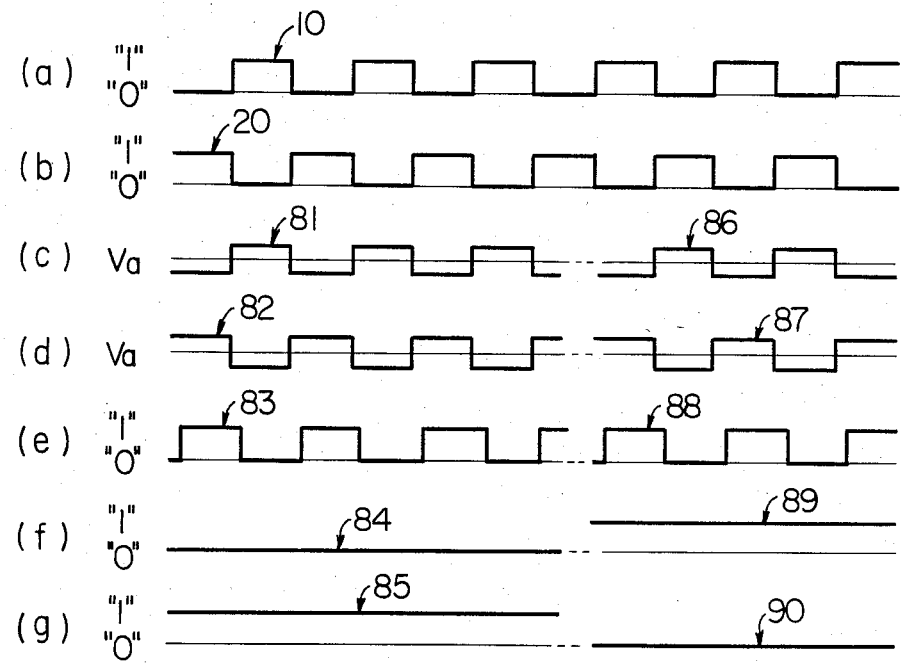
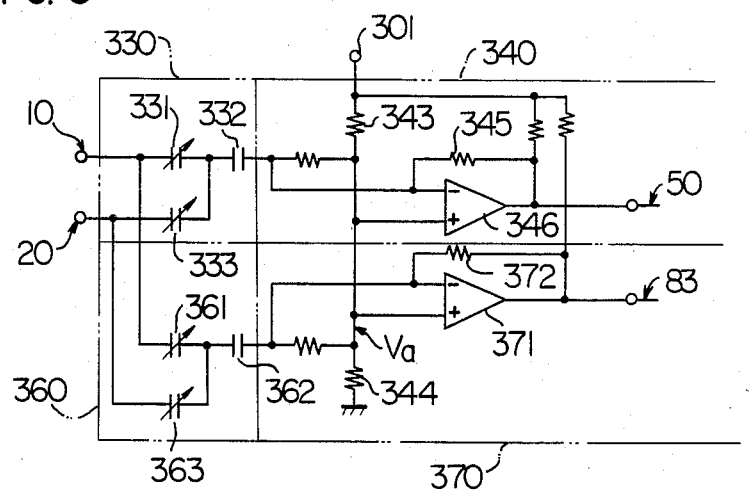

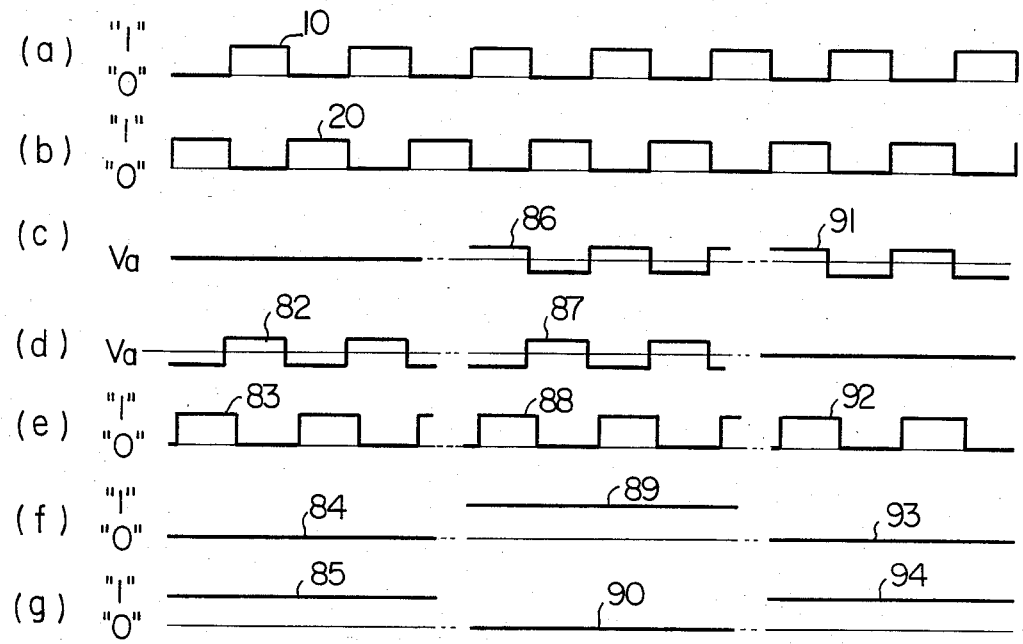
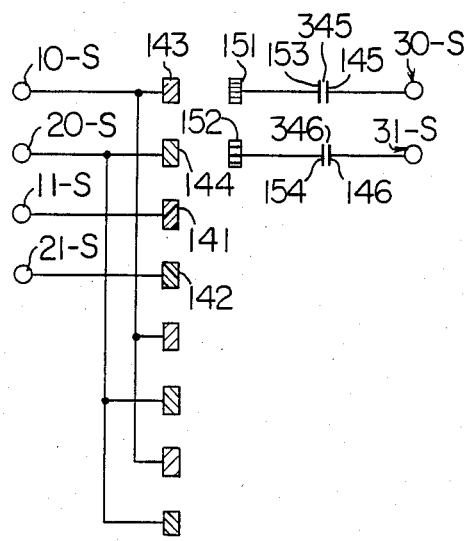
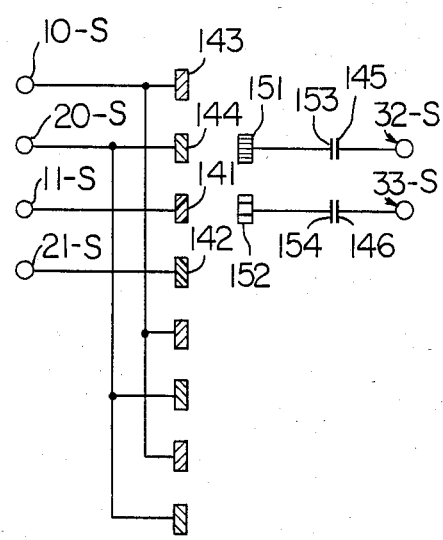

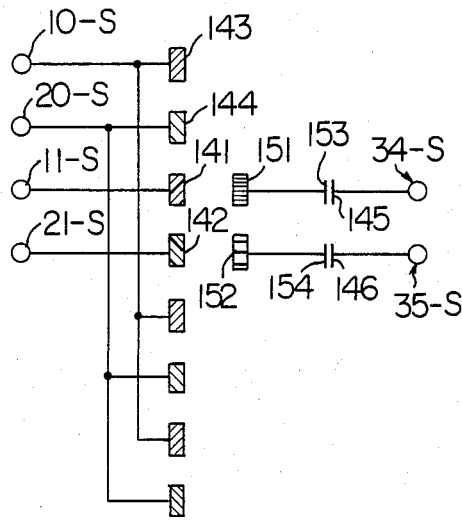
OUTPUT TERMINAL 303 = 1 SIGNAL
OUTPUT TERMINAL 304 = 0 SIGNAL
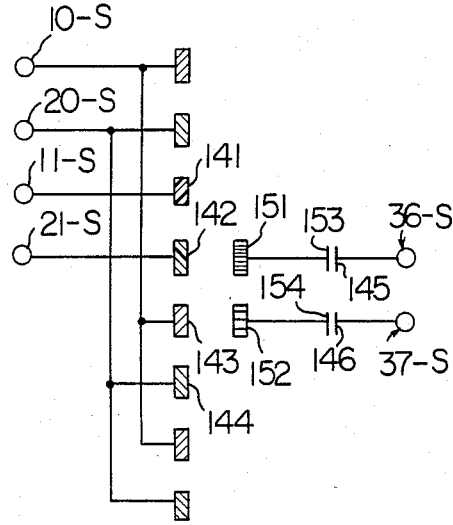
OUTPUT TERMINAL 303 = 0 SIGNAL
OUTPUT TERMINAL 304 = 0 SIGNAL
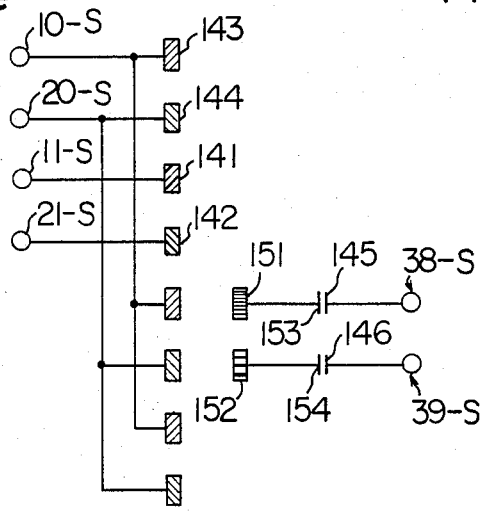
OUTPUT TERMINAL 303 = 0 SIGNAL
OUTPUT TERMINAL 304 = 1 SIGNAL
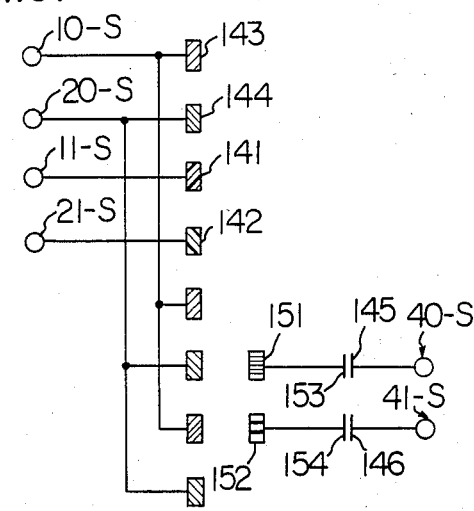
OUTPUT TERMINAL 303 = 0 SIGNAL
OUTPUT TERMINAL 304 = 0 SIGNAL
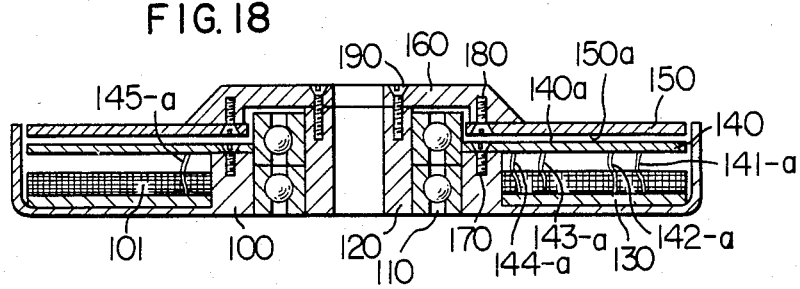

OUTPUT TERMINAL 303 = 0 SIGNAL
OUTPUT TERMINAL 304 = 0 SIGNAL

OUTPUT TERMINAL 303 = 1 SIGNAL
OUTPUT TERMINAL 304 = 0 SIGNAL

OUTPUT TERMINAL 303 = 0 SIGNAL
OUTPUT TERMINAL 304 = 1 SIGNAL

OUTPUT TERMINAL 303 = 0 SIGNAL
OUTPUT TERMINAL 304 = 0 SIGNAL

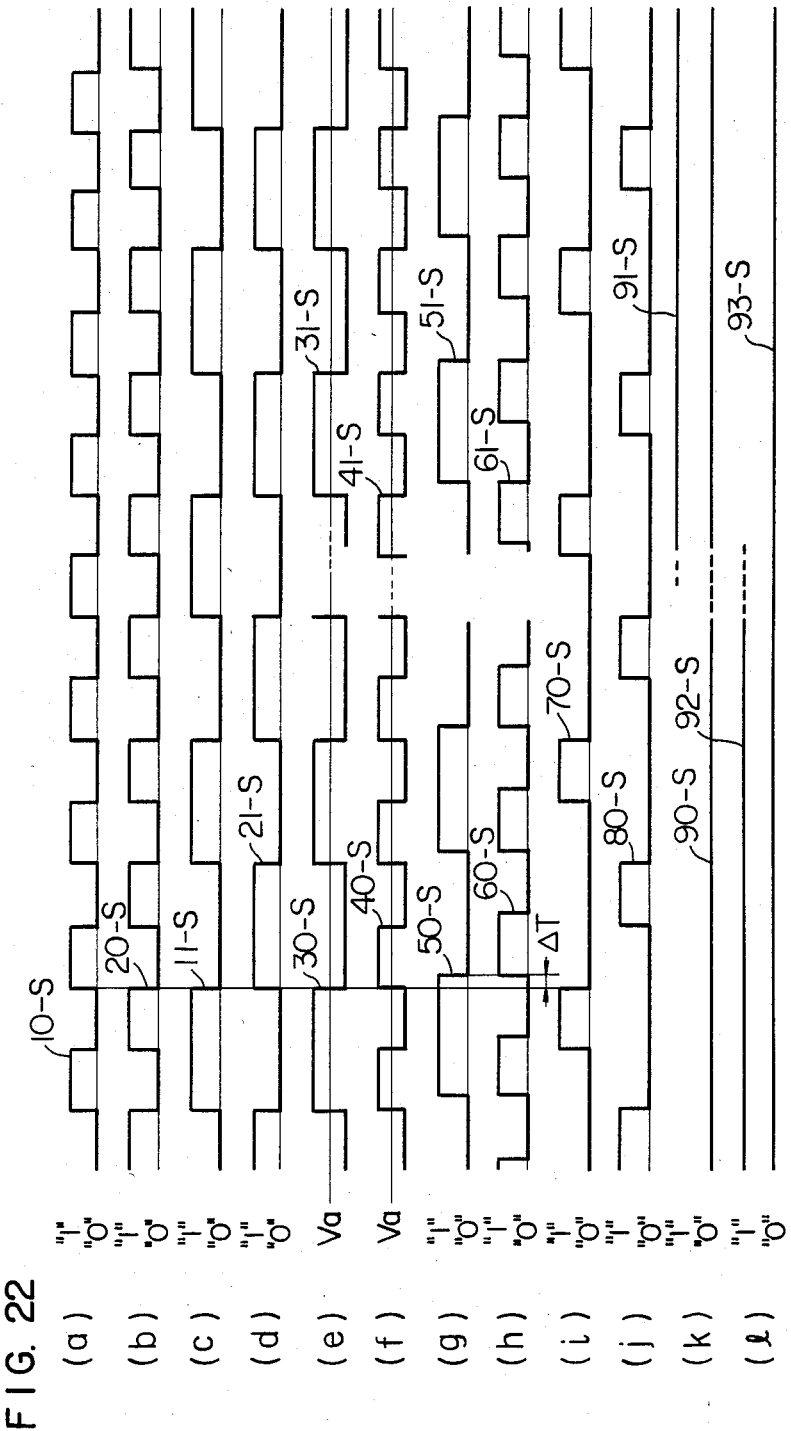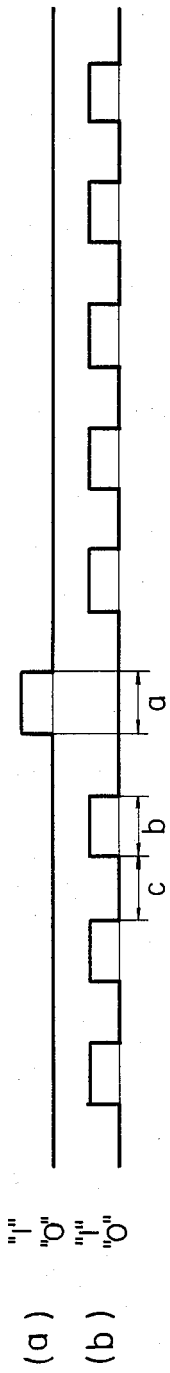

CAPACITIVE-TYPE INCREMENTAL AND REFERENCE ANGULAR ROTATION DETECTING APPARATUS

BACKGROUND OF THE INVENTION

1. Field of the Invention

The present invention relates to an apparatus for detecting the rotational angular positions of the crankshaft of an engine in an automobile or the like, particularly a rotation detecting apparatus capable of detecting the reference angular position and incremental rotational positions of a rotating object such as the crank shaft of an engine without any delay irrespective of its rotational speed. More particularly, the invention relates to a capacity type rotation detecting apparatus in which the transmission of signals is effected by means of the capacitance between the electrodes arranged opposite to one another.

2. Description of the Prior Art

The apparatuses heretofore known for detecting the rotation of the crankshaft of an automobile engine include those in which a magnetic member having a coil would thereon is positioned opposite to a rotational member and an alternating electromotive force is induced in the coil in response to the magnetic flux variations caused by the projections on the rotational member, thereby detecting the rotation of the rotational member.

However, this type of apparatus is disadvantageous in that the alternating electromotive force induced in the coil is affected by the magnetic flux variations, that is, by the rotational speeds of the rotational member and thus, if the rotational speed of the rotational member is low, practically no alternating electromotive force is induced in the coil, making it impossible to detect the rotation of the rotational member.

Another disadvantage is that where the detection of incremental rotational angle signals (i.e., rotational position signals) and reference angular position signals is required, respective corresponding projections must be separately arranged on the rotational member and detecting means must be provided at two places making the construction complicated.

SUMMARY OF THE INVENTION

With a view to overcoming the foregoing deficiencies in the prior art, it is an object of this invention to provide a capacity type rotation detecting apparatus which is capable of detecting the incremental position rotational or position and reference angular position of a rotational member under measurement irrespective of its rotational speed and also capable of detecting the incremental position rotational or position and reference angular position within one and the same aoparatus.

More specifically, this invention has the following objects.

(1) The first object of the invention is to provide a capacity type rotation detecting apparatus comprising a first plate and a second plate arranged opposite to the first plate, the first plate having first and second electrodes of a first input part which are arranged along a circumference at respective equally given intervals and contiguously intermeshed and third and fourth electrodes of a second input part arranged along the same circumference, the second plate having electrodes of a first output part arranged along a circumferene at respective equally given intervals to face the first plate-first input-first and second electrodes and electrodes of a second output part which are arranged to face the first plate-second input-third and fourth electrodes, whereby when one of the plates is rotated so that the first electrode of the first plate faces the first output electrodes of the second plate and the second electrode of the first plate faces the first output electrodes of the second plate, respectively, these two conditions are detected by detecting periodic signal voltages of opposite phase, which are applied to the first and second electrodes of the first plate, by the first output electrodes of the second plate, thereby detecting the incremental rotational position of the rotational member satisfactorily, and also when the third electrode of the first plate faces the second output electrode of the second plate and the fourth electrode of the first plate faces the second output electrode of the second plate, respectively, these two conditions are detected by detecting periodic signal voltage of opposite phase, which are applied to the third and fourth electrodes of the first plate, by the second output electrodes of the second plate, thereby simultaneously and accurately detecting the reference angular position of the rotational member under measurement irrespective of its rotational speed.

(2) The second object of the invention is to provide a capacity type rotation detecting apparatus comprising a first plate having electrodes of first and second input parts arranged at respective equally given intervals and contiguously intermeshed along a first circumference, electrode pieces of a third input part which are arranged along a second circumference at respective different intervals therebetween, electrode pieces of a fourth input part which are arranged at respective equally given intervals with respect to the third input electrode pieces and first, second, third and fourth ring-shaped electrodes, a second plate arranged opposite to the first plate and having first detection electrodes which are arranged to face the first plate-first and second input electrodes, second detection electrodes arranged so that all of the electrodes thereof face the first plate-third and fourth input electrodes once for every plate rotation and first, second, third and fourth ring-shaped electrodes respectively facing the first, second, third and fourth ring-shaped electrodes of the first plate and electrically coupled to the first, second, third and fourth output electrodes, respectively, a periodic signal supply circuit for supplying periodic signals of opposite phases at a predetermined period to the first plate-first and second input electrodes and the first plate-third and fourth input electrodes, respectively, an incremental rotational position signal generating circuit for generating rotational angle signal of the second plate in response to the signals appearing at the second plate-first and second output electrodes when the second plate is rotated relative to the first plate, and a reference angular position signal generating circuit for generating a reference angular position signal in response to the signals appearing at the second plate-third and fourth output electrodes.

(3) The third object of the invention is to provide a capacity type rotation detecting apparatus comprising a first plate having electrode pieces of first and second input parts arranged along a circumference at respective equally given intervals and contiguously intermeshed, the first and second input electrode pieces providing a first input reference angular position detection electrode comprising a set of the first input electrode pieces arranged at respective different intervals therebetween, a second input reference angular position detection electrode comprising a set of the second input electrode pieces each of which is adjacent to an associated one of the first input reference angular position detection electrode pieces at one side thereof, a first input incremental rotational position detection electrode comprising a set of the first input electrode pieces other than the first input reference angular position detection electrode pieces and a second input incremental rotational position detection electrode comprising a set of the second input electrode pieces othe than the second input reference angular position detection electrode pieces and arranged contiguously intermeshed with the first input rotational angle detection electrode pieces and first and second ring-shaped electrodes, a second plate having electrodes of first and second output parts arranged respectively to face the reference angular position detection electrodes of the first and second input parts and first and second ring-shaped electrodes respectively connected to the first and second output electrodes, and a detecting circuit for applying periodic signals of opposite phases to the reference angular position detection electrodes of the first and second input parts at a predetermined period and also applying periodic signals of opposite phases to the incremental rotational position detection electrodes of the first and second input parts at a period which is different from that of the periodic signals applied to the reference angular position detection electrodes of the first and second input parts, thereby detecting the incremental rotational position and reference angular position of the second plate in response to the periodic signals appearing at the first and second output electrodes when the second plate is rotated relative to the first plate.

(4) The fourth object of the invention is to provide a capacity type rotation detecting apparatus comprising a first plate having electrode pieces of first and second input parts which are arranged along a circumference at respective equally given intervals and contiguously intermeshed, the first and second input electrode pieces providing a first input reference angular position detection electrode comprising a set of the first input electrode pieces arranged at respective different intervals therebetween, a second input reference angular position detection electrode comprising a set of the second input electrode pieces each of which is adjacent to an associated one of the first input reference angular position detection electrode pieces at one side thereof, a first input incremental rotational position detection electrode comprising a set of the first input electrode pieces other than the first input reference angular position detection electrode pieces and a second input incremental rotational position detection elecode comprising a set of the second input electrode pieces other than the second input reference angular position detection electrode pieces and a ring-shaped electrode, a second plate having an output electrode which is arranged to face the reference angular position detection electrodes of the first and second input parts and a ring-shaped electrode connected to the output electrodes, and a detecting circuit for applying periodic signals of opposite phases to the first and second input reference angular position detection electrodes at a predetermined period and also applying periodic signals of opposite phases to the first and second input incremental rotational position detection electrodes at a period which is different from that of the periodic signals applied to the first and second input reference angular position detection electrodes, thereby detecting the incremental rotational position and reference angular position of the second plate in response to the periodic signals appearing at the output electrode when the second plate is rotated relative to the first plate.

BRIEF DESCRIPTION OF THE DRAWINGS

FIGS. 4a and 4b are circuit diagrams showing respectively the relative positions of the electrodes of the first input part and the first output part shown in FIGS. 2a, and 2b, occurring during the rotation of the rotational member, and useful for explaining the rotational angle signal detecting operation of the apparatus shown in FIG. 1.

FIGS. 5a–5g shows a plurality of signal waveforms which are useful for explaining the incremental rotational position signal detecting operation of the apparatus shown in FIG. 1.

FIGS. 6a and 6b are circuit diagrams showing respectively the relative positions of the electrodes of the second input part and the second output part shown in FIGS. 2a and 2b, occurring during the rotation of the rotational member, and useful for explaining the reference angular position signal detecting operation of the apparatus shown in FIG. 1.

FIGS. 7a–7g shows a plurality of signal waveforms which are useful for explaining the reference angular position detecting operation of the apparatus shown in FIG. 1.

FIG. 8 is a circuit diagram of a partial modification of the apparatus of the first embodiment of this invention.

FIGS. 12a–12g shows a plurality of signal waveforms which are useful for explaining the reference angular position detecting operation of the second embodiment of this invention.

FIGS. 16a to 16f are circuit diagrams showing respectively the relative positions of the electrodes occurring during the rotation of the rotational member, which are useful for explaining the operation of the apparatus shown in FIG. 13.

FIG. 18 is a longitudinal sectional view showing a capacity type rotation detecting apparatus of a fourth embodiment of this invention.

FIGS. 22a–22l shows a plurality of signal waveforms which are useful for explaining the operation of the detecting circuit section of the embodiment shown in FIG. 20.

FIG. 23 shows a plurality of signal waveforms useful for explaining the output signals of the detecting circuit section shown in FIG. 20.

In the drawings, like reference numerals and symbols refer to corresponding parts or items.

DESCRIPTION OF THE PREFERRED EMBODIMENTS

The present invention will now be described in greater detail with reference to its preferred embodiments illustrated in the accompanying drawings. The first embodiment shown in FIGS. 1a and 1b to FIG. 5 will be described firstly.

Figure 1A:
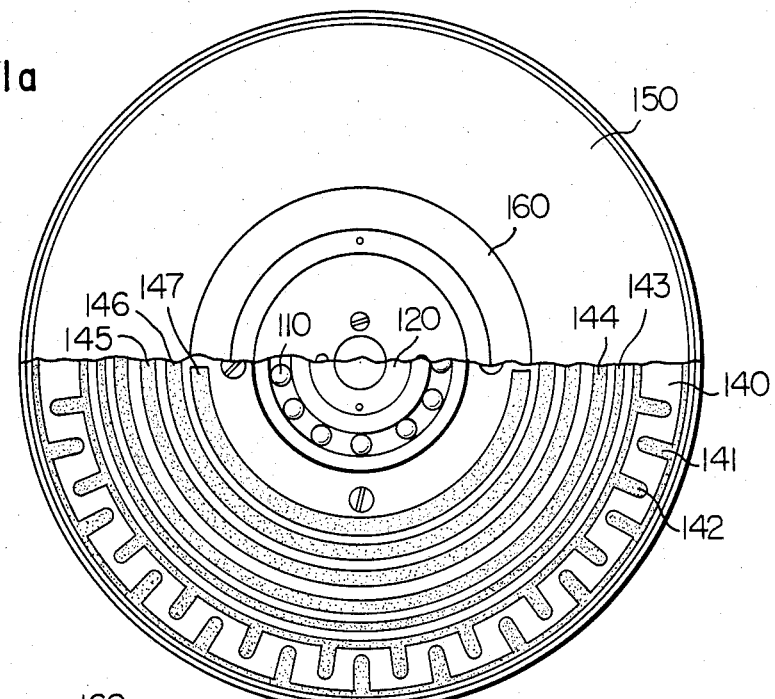
FIGS. 1a and 1b are respectively a partially cutaway view and a longitudinal sectional view showing a first embodiment of the rotation detecting apparatus containing the first and second plates each thereof having the electrode structure according to this invention.
Figure 1B:
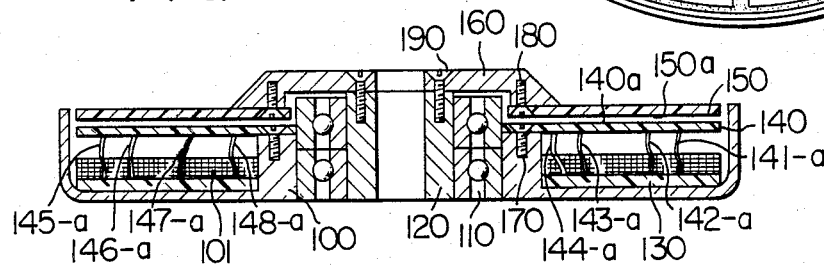

Referring first to FIGS. 1a and 1b, numeral 100 designates a housing fixedly mounted on the outer side of a bearing 110, and 120 a shaft fixedly mounted on the inner side of the bearing 110 and coupled for example to the crankshaft of an engine such that the rotation of the shaft 120 causes the rotation of a rotational member 160 fastened by screws 190 to the shaft 120. Also fastened by screws 180 to the rotational member 160 is a second plate 150 (rotating plate) comprising a printed board having electrodes formed thereon by printing and adapted to be rotated by the rotation of the rotational member 160. Also, a first plate 140 (stationary plate) comprising a printed board having electrodes formed thereon by printing is fastened by screws 170 to the housing 100 and connected to the first plate 140 are signal lines 141-a, 142-a, 143-a, 144-a, 145-a, 146-a, 147-a and 148-a from a detecting circuit section 101 provided on a printed board 130 which is fastened to the housing 100.

Figure 2A:
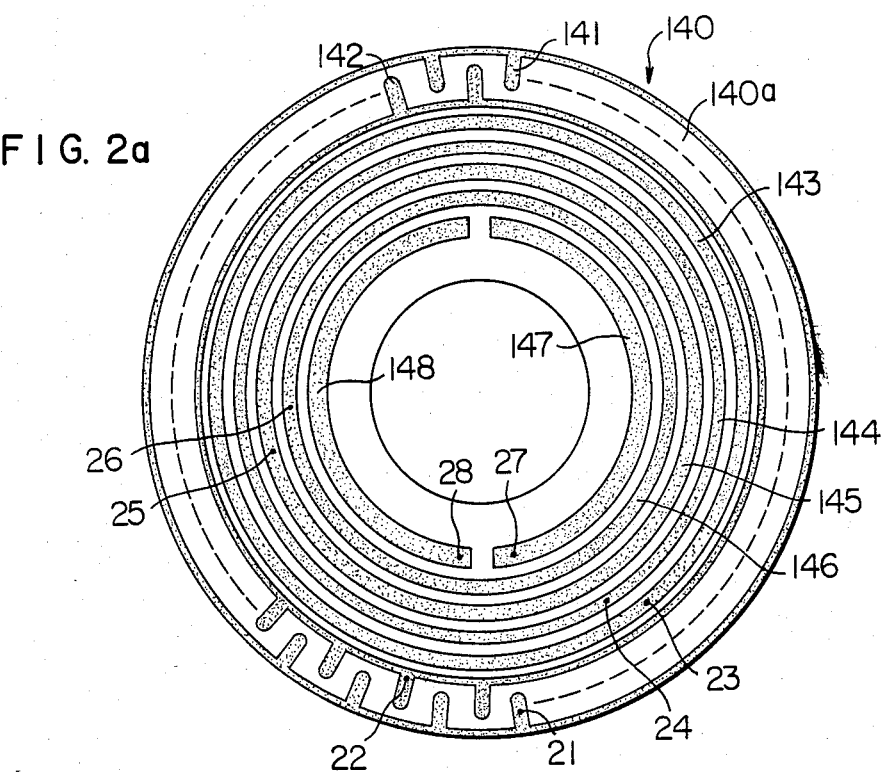
FIGS. 2a and 2b are front views showing respectively the electrode structure of the first and second plates in the apparatus shown in FIG. 1.

FIG. 2a shows a surface 140a of the first plate 140 which faces the second plate 150, and the signal lines 141-a, 142-a, 143-a, 144-a, 145-a, 146-a, 147-a and 148-a are respectively connected via connecting points 21, 22, 23, 24, 25, 26, 27 and 28 to a first electrode 141 and a second electrode 142 of a first input part, a first ring-shaped electrode 143, a second ring-shaped electrode 144, a third ring-shaped electrode 145, a fourth ring-shaped electrode 146, and third and fourth semi-circular electrodes 147 and 148 of a second input part arranged on the same circumference, which are formed on the first plate 140. The first and second electrodes 141 and 142 of the first input part (i.e., first and second first-input electrodes) are arranged circumferentially at respectively equally given intervals and contiguously intermeshed.

Figure 2B:
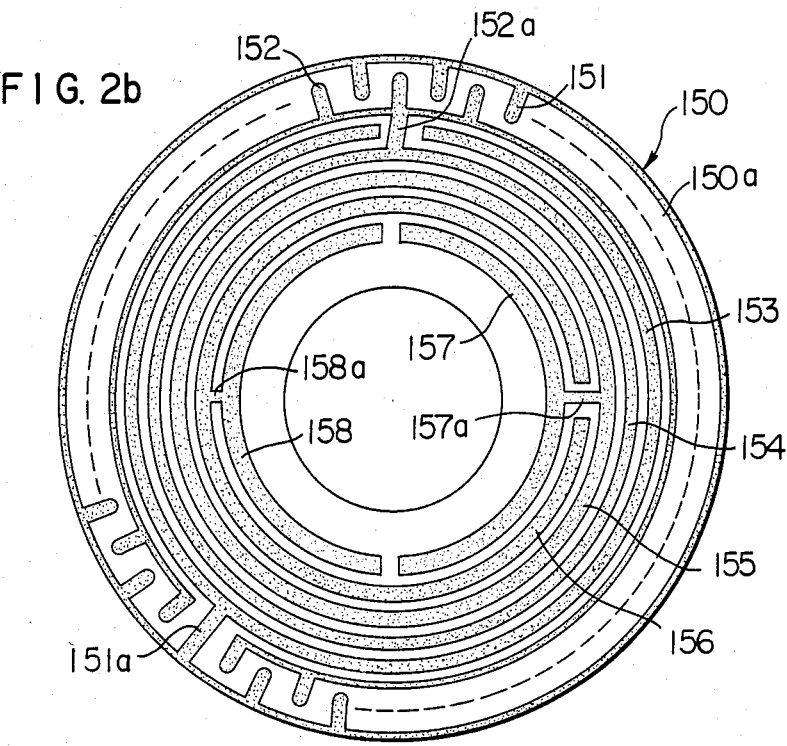

FIG. 2b shows a surface 150a of the second plate 150 which faces the first plate 140 and its pectinated first electrode 151 of a first output part is connected by a lead wire 151a to a first ring-shaped electrode 153 and second electrode 152 of the first output part is connected by a lead wire 152a to a second ring-shaped electrode 154. The first and second electrodes 151 and 152 (constituting first-output electrode means) are arranged circumferentially at respective equally given intervals and contiguously intermeshed.

On the other hand, a third semi-circular electrode 157 of a second output part is connected by a lead wire 157a to a third ring-shaped electrode 155 and a fourth semi-circular electrode 158 of the second output part is connected by a lead wire 158a to a fourth ring-shaped electrode 156. The third and fourth electrodes 157 and 158 of the second output part (constituting a second-output electrode means) are arranged along the same circumference. The plates 140 and 150 have their electrodes printed such that the electrodes 141 and 151, the electrodes 142 and 152, the electrodes 143 and 153, the electrodes 144 and 154, the electrodes 145 and 155, the electrodes 146 and 156, the electrodes 147 and 157 and the electrodes 148 and 158 are respectively positioned to face each other and pass over each other during rotation.

Figure 3:
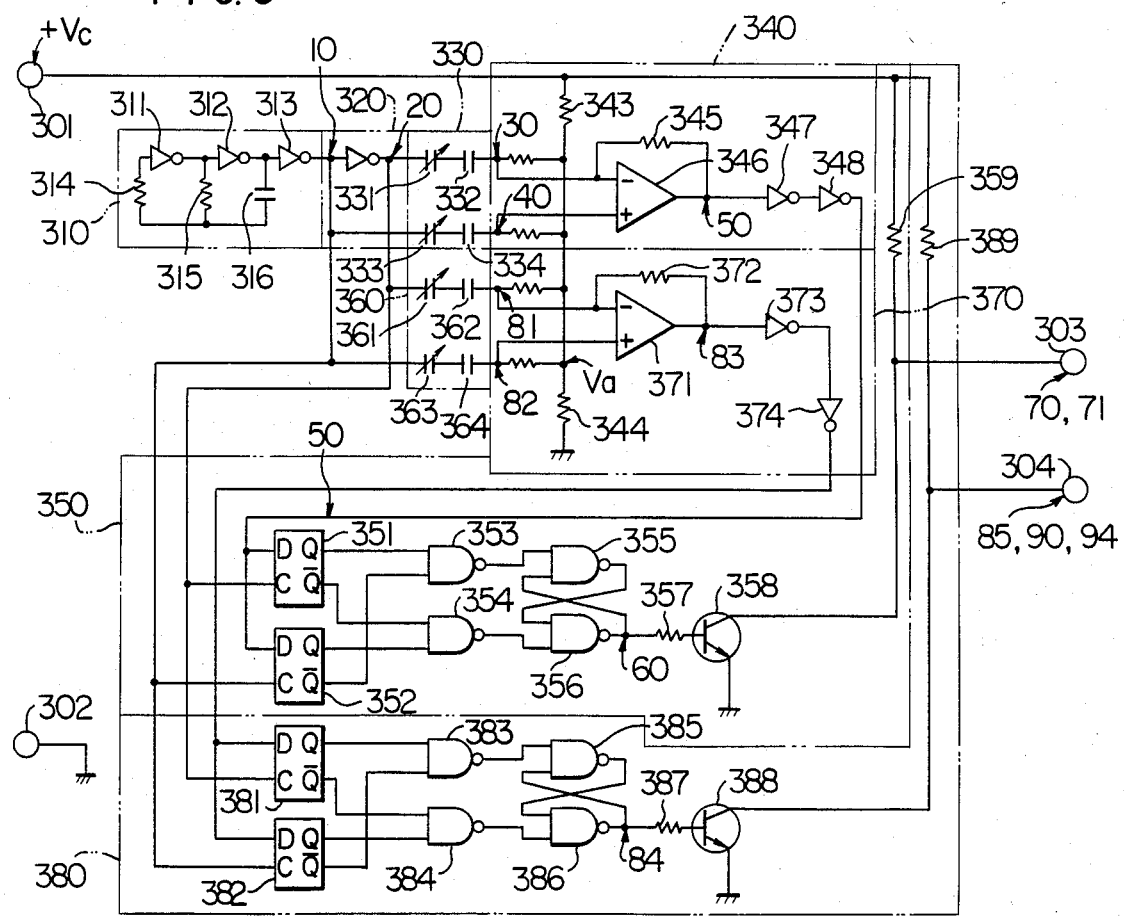
FIG. 3 is a circuit diagram showing an embodiment of the detecting circuit section of the apparatus shown in FIG. 1.

FIG. 3 shows a circuit diagram of the detecting circuit section 101. In the Figure, a terminal 301 is a power supply terminal to which is applied a fixed voltage $+V_C$. A terminal 302 is a ground terminal. Numeral 310 designates a known type CR oscillator circuit, and 320 designates a reference signal generating circuit. The circuits 310 and 320 form a periodic signal supply circuit. Numeral 330 designates a capacitor group comprising the upper electrodes 151, 152, 153 and 154 and the lower electrodes 141, 142, 143 and 144. Numeral 340 designates a first comparison circuit, and 350 a first phase detecting circuit. The circuits 340 and 350 form an incremental rotational position signal generating circuit. Numeral 303 designates a first output terminal (incremental rotational position signal output terminal).

Numeral 360 designates a reference angular position signal detector including a capacitor group comprising the upper electrodes 155, 156, 157 and 158 and the lower electrodes 145, 146, 147 and 148. Numeral 370 designates a second comparison circuit, and 380 a second phase detecting circuit. The circuits 370 and 380 form a reference angular position signal generating circuit. Numeral 304 designates a second output terminal (reference angular position signal output terminal).

With the construction described above, the operation of the first embodiment will now be described. In FIG. 3, the oscillation waveform 10 shown in (a) of FIG. 5 is produced by an oscillator circuit comprising inverter gates 311, 312 and 313, resistors 314 and 315 and a capacitor 316 of the CR oscillator circuit 310. This oscillation waveform 10 is then transmitted to the reference signal generating circuit 320 so that a signal of the same phase as the oscillation waveform 10 and the signal of the opposite phase shown in (b) of incremental FIG. 5 are generated. The method of rotational position signal detection will be described first. Description will be made with reference to a case where the shaft 120 (shown in FIG. 1) is rotated so that the first electrode 151 of the first-output means is positioned opposite to the first-input first electrode 141 of the first plate 140, and the first-output second electrode 152 of the second plate 150 is positioned opposite the first-input second electrode 142 of the first plate 140 as shown in FIG. 4a. When the signal of the same phase as the oscillation waveform 10 is applied to the first-input first electrode 141 of the first plate 140, a signal of the same phase as the oscillation waveform 10 is generated on the signal line 151a shown in FIG. 2b by a capacitor (331 in FIG. 3), comprised of the first-input first electrode 141 of the first plate 140 and the first-output first electrode 151 of the second plate 150, and this signal is transmitted as the signal 30 shown in (C) of FIG. 5 to the first comparison circuit 340 via the connecting point 23 by a capacitor (332 in FIG. 3), comprised of the first ring-shaped electrode 153 of the second plate 150 and the first ring-shaped electrode 143 of the first plate 140. In like manner, the signal 20 transmitted to the first input second electrode 142 of the first plate 140 via the signal line 142-a appears as a signal of the same phase as signal 20 at the first-output second electrode 152 of the second plate 150 by a capacitor (333 in FIG. 3), comprised of the first-input second electrode 142 and the first-output second electrode 152, and then the signal is transmitted as the signal 40 shown in (d) of FIG. 5 to the first comparison circuit 340 via the connecting point 24 by a capacitor (334 in FIG. 3), comprised of the second ring-shaped electrode 154 of the second plate 150 and the second ring-shaped electrode 144 of the first plate 140. It is to be noted that each of the signals 30 and 40 has a waveform using as a bias voltage the voltage Va shown in (c) and (d) of FIG. 5 and determined by voltage dividing resistors 343 and 344 of the first comparison circuit 340. Then, the signals 30 and 40 are differentially amplified by a differential amplifier comprising an operational amplifier 346 (hereinafter referred to as an OP AMP) and a resistor 345 and thus an output signal 50 is produced which is delayed from the oscillation waveform 10 by a time ΔT and having the waveform shown in (e) of FIG. 5. Note that the time ΔT represents the capacitor response delay time and the switching delay time of the OP AMP 346.

Then, the waveform of the signal 50 is reshaped by inverter gates 347 and 348 so that a waveform of the same phase as the signal 50 is applied to the data terminal of D-type flip-flops 351 and 352, respectively. Also, a signal of the same phase as the oscillation waveform 10 is applied from the oscillator circuit 310 to the clock terminal of the D-type flip-flop 352 and a signal of the phase opposite to the oscillation waveform 10 is applied to the clock terminal of the D-type flip-flop 351. Thus, the output terminal Q of the D-type flip-flop 351 goes to "0" and the output terminal $\overline{Q}$ of the D-type flip-flop 352 goes to "1". Then, an output signal 60 whose level is shown by the "0" signal in (f) of FIG. 5 appears through NAND gates 353, 354, 355 and 356. This signal is transmitted to an output circuit comprising a transistor 358 and resistors 357 and 359 so that the transistor 358 is turned off through the resistor 357 and an incremental rotational position signal "1" (the signal 70 shown in (g) of FIG. 5) is generated at the first output terminal 303 indicating that the first-output first electrode 151 of the second plate 150 is opposite the first-input first electrode 141 of the first plate 140 (or the first-output second electrode 152 of the second plate 150 is opposite the first-input second electrode 142 of the first plate 140).

On the other hand, when the first-output first electrode 151 of the second plate 150 is opposite the first-input second electrode 142 of the first plate 140, and the first-output second electrode 152 of the second plate 150 is opposite the first-input first electrode 141 of the first plate 140 as shown in FIG. 4b, a signal of the same phase as the signal 20 is generated at the first-output first electrode 151 of the second plate 150 so that, as mentioned previously, the signal 31 shown in (c) of FIG. 5 and using Va as the bias voltage is generated at the first ring-shaped electrode 143 of the first plate 140, and also a signal of the same phase as the oscillation waveform 10 is generated at the first-output second electrode 152 of the second plate 150 so that the signal 41 shown in (d) of FIG. 5 and using Va as the bias voltage is generated at the second ring-shaped electrode 144 of the first plate 140. Then, a signal such as shown by the signal 51 in (e) of FIG. 5 is generated at the output terminal of the first comparison circuit 340 so that the signal 61 in (f) of FIG. 5 is generated at the output terminal of the NAND gates 355 and 356 of the first phase detecting circuit 350 and an incremental rotational position signal "0" (the signal 71 shown in (g) of FIG. 5) is generated at the first output terminal 303 indicating that the first output first electrode 151 of the second plate 151 is opposite the first-input second electrode 142 of the first plate 140.

In this way, the first-output first and second electrodes 151 and 152 arranged on the second plate 150 pass over the first-input first and second electrodes 141 and 142 arranged on the first plate 140 in response to the incremental rotation of the shaft 120, and "1" and "0" signals are alternately generated at the first output terminal 303, thereby detecting the incremental rotation of the second plate 150 or the incremental rotation of the shaft 120.

Next, the method of the reference angular position signal detection will be described.

Description will be made first with reference to a case where the second-output third electrode 157 of the second plate 150 is opposite the second-input third electrode 147 of the first plate 140 and the second-output fourth electrode 158 of the second plate 150 is opposite the second input fourth electrode 148 of the first plate 140 as shown in FIG. 6a. The previously mentioned signals 10 and 20 generated from the reference signal generating circuit 320 are respectively applied to the second-input third and fourth electrodes 147 and 148 of the first plate 140. Thus, a signal of the same phase as the signal 10 appears at the second-output third electrode 157 of the second plate 150 and this signal is transmitted by a capacitor (the capacitor 362 in FIG. 3), comprised of the third ring-shaped electrode 155 of the second plate 150 and the third ring-shaped electrode 145 of the first plate 140, thereby generating at the third ring-shaped electrode 145 of the first plate 140 the signal 81 shown in (c) of FIG. 7 and using Va as the bias voltage. In like manner, a signal of the same phase as signal 20 appears at the second-output fourth electrode 158 of the second plate 150 and this signal is transmitted through a capacitor (the capacitor 364 in FIG. 3), comprised of the fourth ring-shaped electrode 156 of the second plate 150 and the fourth ring-shaped electrode 146 of the first plate 140, thereby generating at the fourth ring-shaped electrode 146 of the first plate 140 the signal 82 shown in (d) of FIG. 7 and using Va as the bias voltage. These signals are transmitted to the second comparison circuit 370 which in turn produces at its output terminal the signal shown by 83 in (e) of FIG. 7, so that the signal 84 in (f) of FIG. 7 is generated at the output terminal of the second phase detecting circuit 380 and a signal "1" (the signal 85 in (g) of FIG. 7) is generated at the second output terminal 304 indicating that the second-output third electrode 157 of the second plate 150 is opposite the second-input third electrode 147 of the first plate 140.

Then, when the second-output third electrode 157 of the second plate 150 is positioned opposite the second-input fourth electrode 148 of the first plate 140 and the second-output fourth electrode 158 of the second plate 150 is positioned opposite the second-input third electrode 147 of the first plate 140 as shown in FIG. 6b, a signal of the same phase as the signal 20 (the signal 86 in (c) of FIG. 7) appears at the third ring-shaped electrode 145 of the fist plate 140 and a signal of the same phase as the signal 10 (the signal 87 in (d) of FIG. 7) appears at the fourth ring-shaped electrode 146 of the first plate 140. As a result, the signal shown by 88 in (e) of FIG. 7 is generated at the output terminal of the second comparison circuit 370 and the signal 89 in (f) of FIG. 7 is generated at the output terminal of the second phase detecting circuit 380, thereby generating at the second output terminal 304 a signal "0" (the signal 90 in (g) of FIG. 7) indicating that the third semi-circular electrode 157 of the second plate 150 is opposite the fourth semi-circular electrode 148 of the first plate 140.

In this manner, the signal appearing at the second output terminal 304 goes from the "1" level to the "0" level once for every rotation of the shaft 120 and thus, by using the leading edge or the falling edge of this signal as a reference angular position signal, it is possible to obtain an accurate reference angular position.

While, in the first embodiment described above, the first and second electrodes 151 and 152 and the third and fourth electrodes 157 and 158 are provided respectively as the electrodes of the first and second inputs of the second plate 150, and the signals appearing at these electrodes are compared by the first and second comparison circuits 340 and 370, respectively, one or the other of the electrodes of the first and second inputs, respectively, may be eliminated. For instance, where only the first electrode 151 is used as the first output electrodes and the third electrode 157 as the second output electrode, only the first and third electrodes 153 and 155 are required as the ring-shaped electrodes. The circuit diagram of FIG. 8 shows a modified form of the rotational angle signal detector 330, the reference angular position signal detector 360 and the first and second comparison circuits 340 and 370 for this purpose. In this case, the same results as the above-described first embodiment can be obtained by comparing the signals appearing at the first and third ring-shaped electrodes 153 and 155 with the predetermined voltage Va in the first and second comparison circuits 340 and 380, respectively, to generate an output.

Next, the second embodiment of the invention will be described. Its construction will be described first with reference to FIGS. 9a and 9b.

Figure 9A:
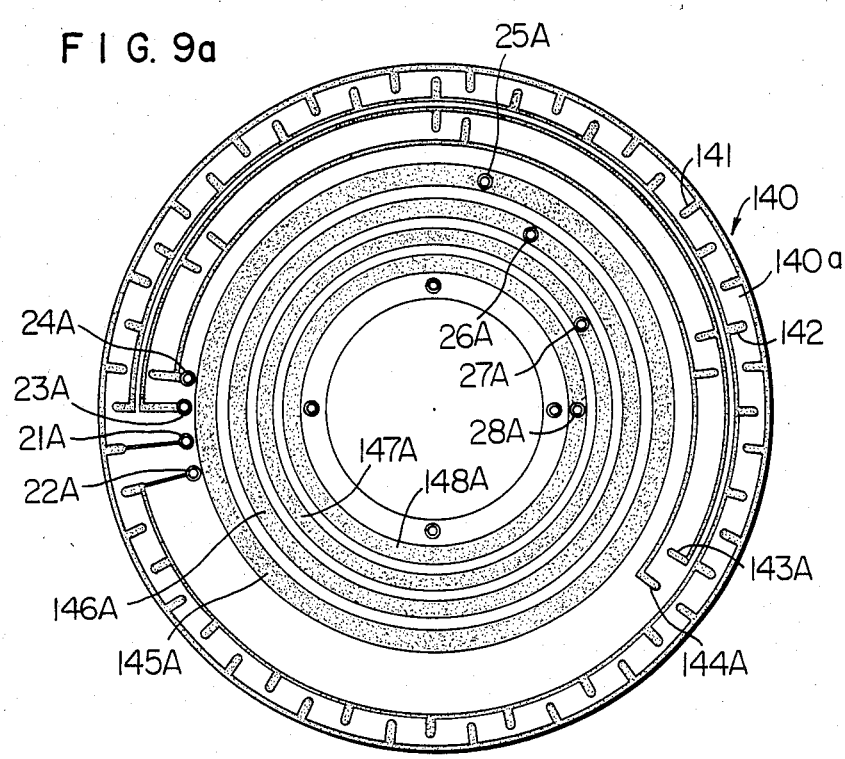
FIGS. 9a and 9b are front views showing respectively the electrode structure of the first and second plates of a capacity type rotation detecting apparatus of a second embodiment of this invention.

FIG. 9a is a front view showing a surface 140a of a first plate 140 which faces a second plate 150. In the construction of the first embodiment shown in FIG. 1b which is used in common with the first and second embodiments, signal lines 141-a, 142-a, 143-a, 144-a, 145-a, 146-a, 147-a and 148-a are respectively connected via connecting points 21A, 22A, 23A, 24A, 25A, 26A, 27A and 28A to first, second, third and fourth input electrodes 141, 142, 143 and 144 each having a plurality of pectinated electrode pieces and first, second, third and fourth ring-shaped electrodes 145A, 146A, 147A and 148A of a first plate 140. Here, the first and second input electrodes 141 and 142 of the first plate 140 are arranged along a first circumference at respective equally given intervals and contiguously intermeshed, and the third input electrode 143A is arranged along a second circumference with all the adjacent electrode pieces arranged at respective different intervals. The fourth input electrode 144A of the first plate 140 is arranged along the second circumference at respective equally given intervals with respect to the third input electrode 143A in the same direction along the second circumference.

Figure 9B:
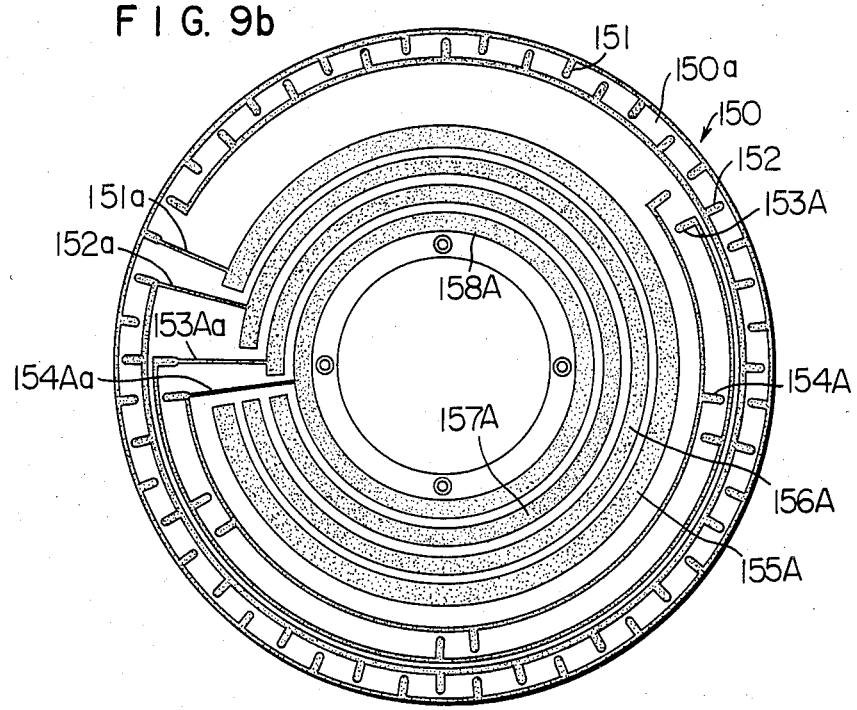

FIG. 9b is a front view showing a surface 150a of a second plate 150 which faces the first plate 140, and first and second output electrodes 151 and 152 which form first detection electrodes of the second plate 150 are arranged to face the first and second input electrodes of the first plate 140. Also, third and fourth output electrodes 153A and 154A which form second detection electrodes of the second plate 150 are arranged such that all the electrodes are positioned opposite to the third and fourth input electrodes 143A and 144A of the first plate 140 only once for every rotation of the second plate 150 with respect to the first plate 140. Also, first, second, third and fourth ring-shaped electrodes 155A, 156A, 157A and 158A of the second plate 150 are arranged at positions respectively opposing the first, second, third and fourth ring-shaped electrodes 145A, 146A, 147A and 148A of the first plate 140, and the first, second, third and fourth ring-shaped electrodes 155A, 156A, 157A and 158A of the second plate 150 are respectively connected to the first, second, third and fourth output electrodes 151, 152, 153A and 154A of the second plate 150.

Figures 10A, 10B:
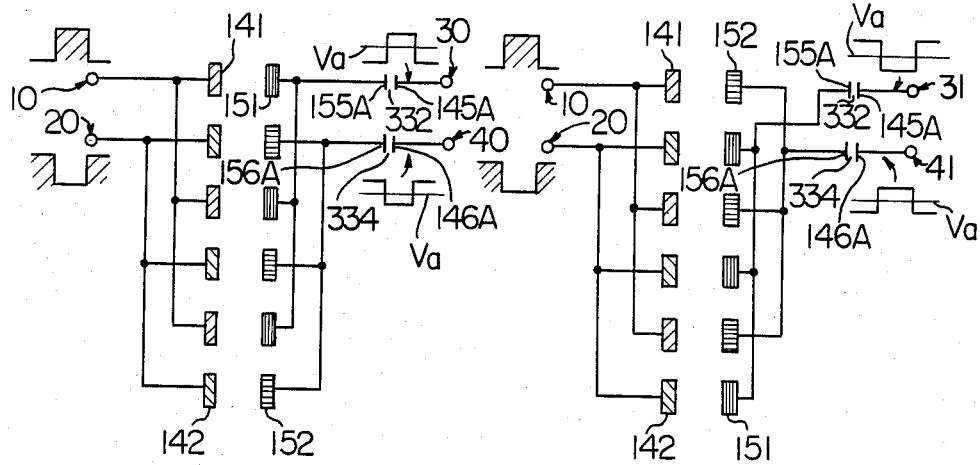
FIGS. 10a and 10b are circuit diagrams showing the relative positions of the first and second input electrodes of the first plate and the first detection electrodes of the second plate shown in FIGS. 9a and 9b, occurring during the rotation of the rotational member, and useful for explaining the operation of the apparatus of the second embodiment of this invention.

Next, the construction of the detecting circuit section 101 in FIG. 1b is substantially the same with the construction shown in FIG. 3 for the first embodiment. The only differences reside in that the capacitor group forming the rotational angle signal detector 330 comprises the electrodes 151, 152, 155A and 156A of the second plate 150 and the electrodes 141, 142, 145A and 146A of the first plate 140 and that the capacitor group forming the reference angular position signal detector 360 comprises the electrodes 153A, 154A, 157A and 158A of the second plate 150 and the electrodes 143A, 144A, 147A and 148A of the first plate 140. As regards the method of rotational angle signal detection which is one of the functions of the detecting circuit section 101, FIGS. 10a and 10b for explaining the method correspond to FIGS. 4a and 4b for the first embodiment and also the corresponding signal waveform diagram is all the same with FIG. 5 for the first embodiment. Thus, the function is identical with that of the first embodiment and its explanation is omitted. Only the method of reference angular position signal detection which is different from that of the first embodiment will be described with reference to FIGS. 11a, 11b, 11c and 12. Note that those signals generated in respose to the relative positions of the opposing electrodes of the first and second plates 140 and 150 correspond respectively to the waveform diagrams shown in the left, center and right portions of (c) to (g) of FIG. 12.

Figure 11A:
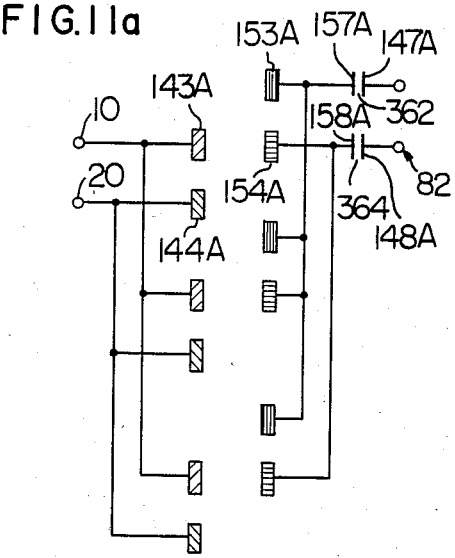
FIGS. 11a, 11b and 11c are circuit diagrams showing respectively the relative positions of the third and fourth input electrodes of the first plate and the second detection electrodes of the second plate shown in FIGS. 9a and 9b, occurring during the rotation of the rotational member, and useful for explaining the operation of the apparatus of the second embodiment of this invention.

Description will be made first with reference to a case where the whole of the fourth output electrode 154A of the second plate 150 is positioned opposite to the whole of the thrid input electrode 143A of the first plate 140 as shown in FIG. 11a. In this case, all the electrode pieces of the third output electrode 153A of the second plate 150 are facing none of the input electrodes of the first plate 140. The signals 10 and 20 generated from the reference signal generating circuit 320 are respectively applied to the third and fourth input electrodes 143A and 144A of the first plate 140 so that a signal of the same phase as the signal 10 is generated at the fourth output electrode 154A of the second plate 150 and this signal is transmitted to the second comparison circuit 370 by way of a capacitor (the capacitor 364 in FIG. 3) comprising the fourth ring-shaped electrode 158A of the second plate 150 and the fourth ring-shaped electrode 148A of the first plate 140, thereby generating at the fourth ring-shaped electrode 148A of the first plate 140 the signal 82 shown in (d) of FIG. 12 and biased by the voltage Va. Since the third output electrode 153A of the second plate 150 is not facing any of the input electrodes of the first plate 140 as mentioned previously, no signal is generated at the third-ring shaped electrode 147A of the first plate 140. The signal 82 is amplified by the second comparison circuit 370 so that it is generated as a signal 83 whose waveform is reshaped by the inverter gates 373 and 374 and a signal of the same phase as the signal 83 is transmitted to the second phase detecting circuit 380. As a result, the signal 84 shown in (f) of FIG. 12 is generated on the output line 84 of the second phase detecting circuit 380 (see FIG. 3) and the signal appears as a "1" level signal such as shown by the signal 85 in (g) of FIG. 12 at the reference angular position signal output terminal 304.

Figure 11B:
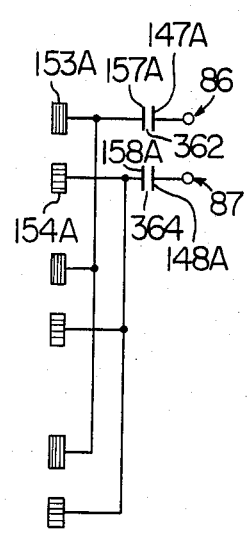

Next, when the third output electrode 153A of the second plate 150 is positioned opposite to the third input electrode 143A of the first plate 140 shown in FIG. 11a and the fourth output electrode 154A of the second plate 150 is opposite to the fourth input electrode 144A of the first plate 140 as shown in FIG. 11b, a signal of the same phase as the oscillation waveform 10 (the signal 86 in FIG. 10) is generated at the third ring-shaped electrode 147A of the first plate 140 and a signal of the same phase as the signal 20 (the signal 87 in FIG. 12) appears at the fourth ring-shaped electrode 148A of the first plate 140 so that the signal shown by 88 in (e) of FIG. 12 is generated at the output terminal of the second comparison circuit 370 and the signal 89 in (f) of FIG. 12 is generated at the output terminal of the second phase detecting circuit 380. Thus, a signal "0" (the signal 90 in FIG. 12) is generated at the reference angular positoin signal output terminal 304 indicating that the third output electrode 153A of the second plate 150 is opposite to the third input electrode 143A of the first plate 140.

Figure 11C:
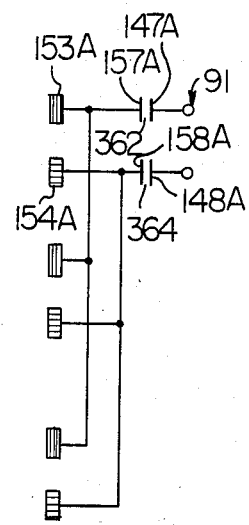

Then, when the third output electrode 153A of the second plate 150 is positioned opposite to the fourth input electrode 144A of the first plate 140 shown in FIG. 11a as shown in FIG. 11c, a signal 91 (see (c) of FIG. 12) of the same phase as the signal 20 is generated at the third ring-shaped electrode 147A of the first plate 140. At this time, the fourth output electrode 154A of the second plate 150 is not facing the input electrodes of the first plate 140 and thus no signal is generated at the fourth ring-shaped electrode 148A of the first plate 140. Then, the signal 91 is amplified by the second comparison circuit 370 so that the signal 92 shown in (e) of FIG. 12 is generated at the output terminal of the second comparison circuit 370 and the signal 93 in (f) of FIG. 12 is generated at the output terminal of the second phase detecting circuit 380, thereby generating a "1" signal (the signal 94 in (g) of FIG. 12) at the reference angular position signal output terminal 304.

On the other hand, when the shaft 120 is rotated so that the second plate 150 is rotated, at any other position than those described in connection with FIGS. 11a, 11b and 11c the third or foruth output electrode of the second plate 150 faces only one of the electrode pieces of the third or fourth electrode of the first plate 140 at the most and thus this can be ignored.

In this way, the signal appearing at the second output terminal 304 goes from the "1" level to the "0" level or from the "0" level to the "1" level once for every rotation of the shaft 120 and thus, by using the leading edge or the falling edge of this signal as a reference angular position signal, it is possible to obtain an accurate reference angular position.

While, in the second embodiment described above, the first and second output electrodes 151 and 152 and the third and fourth output electrodes 153A and 154A are provided as the first detection electrodes and the second detection electrodes, respectively, of the second plate 150 and the signals generated at these electrodes are respectively compared in the first and second comparison circuits 340 and 370, one or the other of the first and second detection electrodes, respectively, may be eliminated. For example, if only the first output electrode 151 is used as the first detection electrode and only the third output electrode 153A is used as the second detection electrode, only the first and third electrodes 155A and 157A of the ring-shaped electrodes are required. In this case, as in the case of the electric circuitry of FIG. 8 for the first embodiment, the same result as the above-mentioned second embodiment can be obtained by comparing the signals appearing at the first and third ring-shaped electrodes 155A and 157A with the predetermined voltage Va in the first and second comparison circuits 340 and 370, respectively, to generate an output.

The third embodiment of the invention will now be described with reference to FIGS. 13 to 17.

Figure 13:
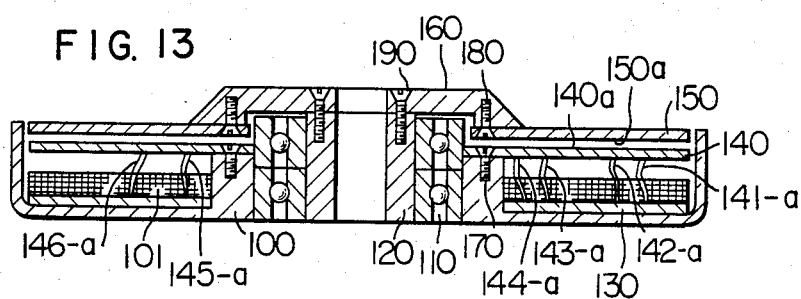
FIG. 13 is a longitudinal sectional view of a capacity type rotation detecting apparatus of a third embodiment of this invention.
Figure 14A:
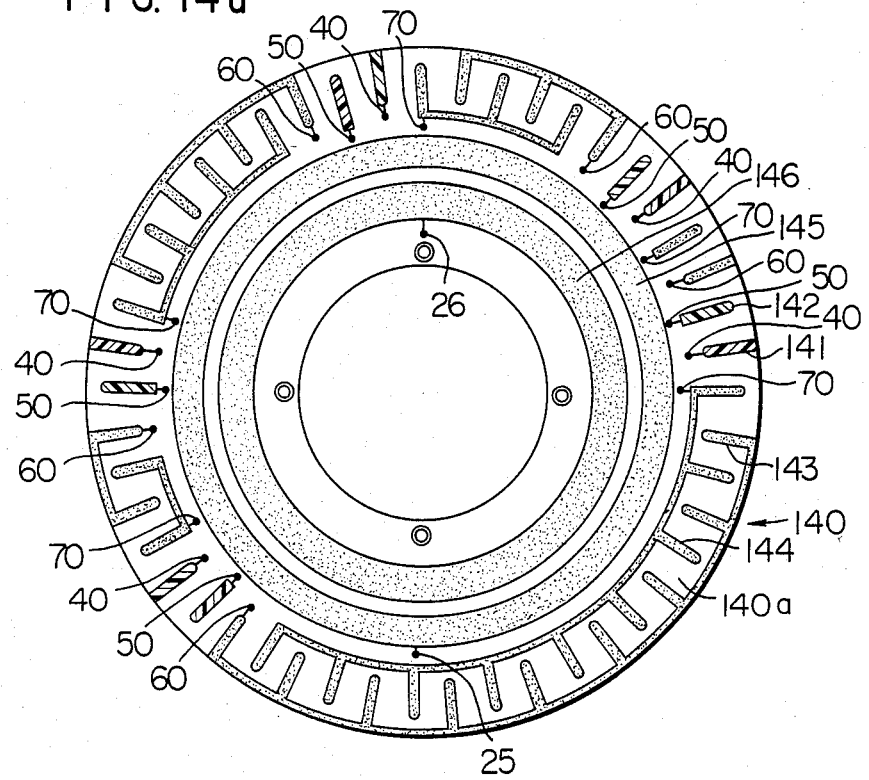
FIGS. 14a and 14b are front views showing respectively the first plate and the second plate used in the apparatus shown in FIG. 13.
Figure 14B:
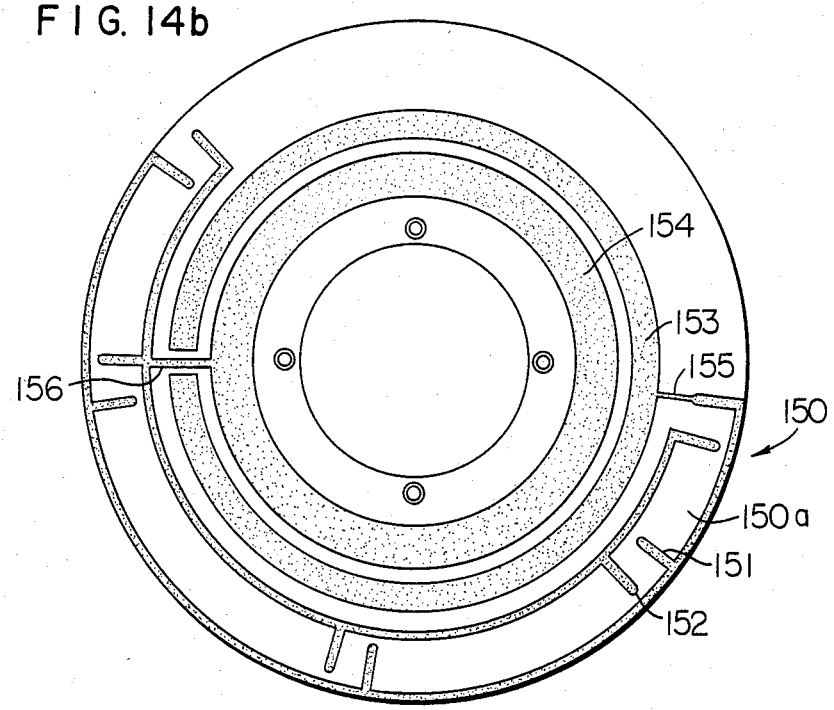

FIG. 13 is a longitudinal sectional view showing the mechanical construction of a capacity type rotation detection apparatus according to the third embodiment of the invention as in the case of FIG. 1b for the first embodiment. In the third embodiment-however, the signal lines 141-a, 142-a, 143-a, 144-a, 145-a and 146-a from the detecting circuit section 101 provided on the printed board 130 attached to the housing 100 are connected to the electrodes of the first plate 140. In other words, in FIG. 14a illustrating a front view showing the surface 140a of the first plate 140 which faces the second plate 150, its signal lines 141-a, 142-a, 143-a, 144-a, 145-a and 146-a are connected via connecting points 40, 50, 60, 70, 25 and 26 to first and second input reference angular position detection electrodes 141 and 142 and first and second input rotational angle detection electrodes 143 and 144, each including a plurality of pectinated electrode pieces, and first and second ring-shaped electrodes 145 and 146 of the first plate 140. The first and second input reference angular position detection electrodes 141 and 142 have their respective electrode pieces arranged at respective different intervals and they are respectively interconnected on the back surface via the connecting points 40 and 50. The first and second input rotational angle detection electrodes 143 and 144 are arranged in a manner that their electrode pieces are radially arranged alternately in those portions where the first and second input reference angular position detection electrodes are not present and are respectively interconnected on the front surface as well as on the back surface via the connecting points 60 and 70, respectively. FIG. 14b is a front view showing the surface 150a of the second plate 150 which faces the first plate 140, and first and second output electrodes 151 and 152 are respectively connected electrically to ring-shaped electrodes 153 and 154 by lead wires 155 and 156. Also it is so arranged that when the second plate 150 is rotated, the whole of the first and second output electrodes 151 and 152 are respectively positioned opposite to the first and second input reference angular position detecting electrodes 141 and 142 of the first plate 140 at only one position. The first and second ring-shaped electrodes 153 and 154 of the second plate 150 are arranged at positions opposite to the first and second ring-shaped electrodes 145 and 146 of the first plate 140.

Figure 15:
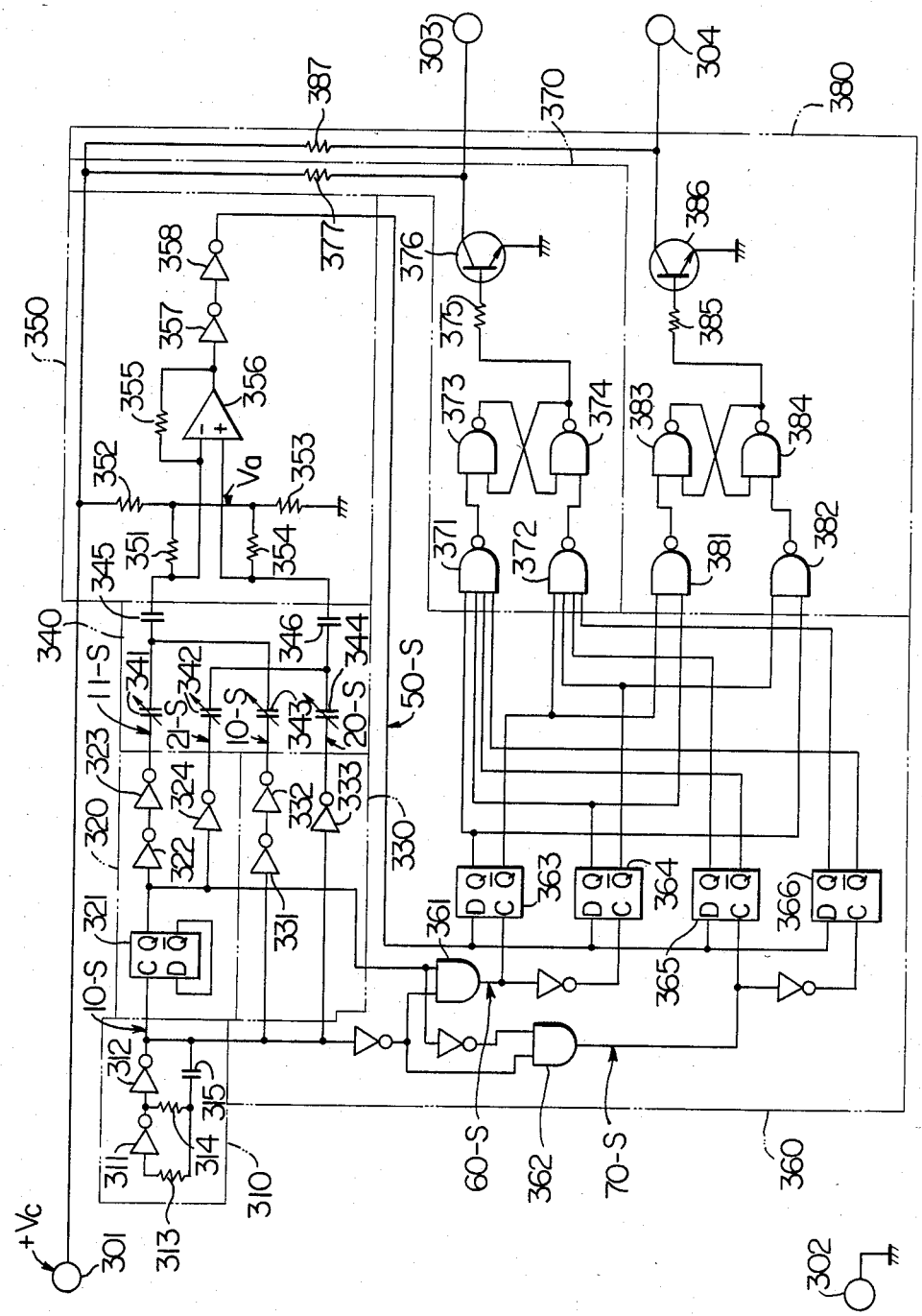
FIG. 15 is a circuit diagram showing an embodiment of the detecting circuit section of the apparatus shown in FIG. 13.

FIG. 15 shows a circuit diagram of the detecting circuit section 101. In the Figure, a terminal 301 is a power supply terminal to which is applied a constant voltage $+V_C$. A terminal 302 is a ground terminal. Numeral 310 designates a known type CR oscillator circuit, 320 a first reference signal generating circuit, 330 a second reference signal generating circuit, 340 a capacitor group comprising the electrodes 151, 152, 153 and 154 of the second plate 150 and the electrodes 141, 142, 143, 144, 145 and 146 of the first platel 140, 350 a comparison circuit, 360 a phase detecting circuit, 370 a reference angular position signal output circuit, 380 a rotational angle signal output circuit, 303 a reference angular position signal output terminal, and 340 a rotational angle signal output terminal.

The CR oscillator circuit 310 and the first reference signal generating circuit 320 form a first periodic signal supply circuit, and the CR oscillator circuit 310 and the second reference signal generating circuit 330 form a secord periodic signal supply circuit. Also, the comparison circuit 350, the phase detecting circuit 360, the reference angular position signal output circuit 370 and the rotational angle signal output circuit 380 form a detecting circuit.

With the construction described above, the operation of the circuitry will now be described with reference to FIGS. 15, FIGS. 16a to 16f and FIG. 17. In FIG. 15, the CR oscillator circuit 310 comprising inverter gates 311 and 312, resistors 313 and 314 and a capacitor 315 produces the oscillation waveform 10-s shown in (a) of FIG. 17. The oscillation waveform 10-s is transmitted to the first reference signal generating corcuit 320, and the waveform 11-s shown in (c) of FIG. 17 obtained by the 2:1 frequency division of the oscillation waveform 10-s and the waveform 21-s shown in (d) of FIG. 17, which is opposite in phase to the waveform 11-s, are produced through a D-type flip-flop 321 and inverter gates 322, 323 and 324. The oscillation waveform 10-s is also transmitted to the second reference signal generating circuit 330, and a signal of the same phase as the oscillation waveform 10-s and the signal 20-s of the opposite phase shown in (b) of FIG. 17 are generated there.

The operation will now be described with reference to a case where the shaft 120 of FIG. 13 is rotated so that the second plate 150 is also rotated bringing its first output electrode 151 opposite to the first input rotational angle detection electrode 143 of the first plate 140 and the second output electrode 152 opposite to the second input rotational angle detection electrode 144 of the first plate 140 as shown in FIG. 16a. While this represents the case in which the first and second output electrodes 151 and 152 of the second plate 150, respectively, have, at the most, one of their electrode pieces positioned opposite to the first and second input electrodes 141 and 142 of the first plate 140, this number is negligible as compared with the number of the first and second output electrode pieces facing the first and second input rotational angle detection electrodes 143 and 144, respectively, of the first plate 140 in this condition (the number of the electrode pieces is 4 at the least in this embodiment). A signal of the same phase as the oscillation waveform 10-s is generated on the lead wire 155 shown in FIG. 14b via the signal line 143-a and a capacitor (343 in FIG. 15) comprising the first input rotational angle detection electrode 143 of the first plate 140 and the first output electrode 151 of the second plate 150 and the signal is then transmitted as a signal 30-s (see (e) of FIG. 17) to the comparison circuit 350 of FIG. 15 via the connecting point 25 by a capacitor (345 in FIG. 15) comprising the first ring-shaped electrode 153 of the second plate 150 and the first ring-shaped electrode 145 of the first plate 140. Also, a signal 20-s of the opposite phase to the oscillation waveform 10-s is applied to the second input rotational angle detection electrode 144 of the first plate 140 via the signal line 144a so that a sigtal of the same phase as the signal 20-s is generated on the lead wire 156 shown in FIG. 14b by way of a capacitor (344 in FIG. 15) comprising the electrode 144 and the second output electrode 152 of the second plate 150 and the signal is then transmitted as a signal 31s (see (e) of FIG. 17) to the comparison circuit 350 of FIG. 15 via the connecting point 26 by a capacitor (346 in FIG. 15) comprising the second ring-shaped electrode 154 of the second plate 150 and the second ring-shaped electrode 146 of the first plate 140. Note that the waveforms of the signals 30-s and 31-s are biased by the voltage Va determined by resistors 352 and 353 of the comparison circuit 350. The signals 30-s and 31s are then differentially amplified by a differential amplifier circuit comprising an operational amplifier 356 (hereinafter simply referred to as an OP AMP) and a resistor 355 of the comparison circuit 350 and the amplified signal is then reshaped through inverter gates 357 and 358, thereby generating a signal 50-s of the waveform shown in (l) of FIG. 17 and delayed by ΔT with respect to the signal 20-s. Note that the delay ΔT represents the capacitor response delay time and the switching delay time of the OP AMP 356.

The signal 50-s is transmitted to the phase detecting circuit 360 and applied to the data input of its D-type flip-flops 363, 364, 365 and 366, respectively. Also, the signal 60-s shown in (r) of FIG. 17 is applied to the clock terminal of the D-type flip-flop 363 and a signal of the phase opposite to the signal 60-s is applied to the clock terminal of the D-type flip-flop 364. Also, the signal 70-s shown in (s) of FIG. 17 is applied to the clock terminal of the D-type flip-flop 365 and a signal of the phase opposite to the signal 70-s n is applied to the clock terminal of the D-type flip-flop 366. When the above-mentioned signal 50-s is applied to the D-type flip-flops 363, 364, 365 and 366, respectively, a "0" is generated at the output terminal Q of the D-type flip-flops 363 and 365, respectively, and a "1" is generated at the output terminal Q of the D-type flip-flops 364 and 366, respectively. The output signals of the D-type flip-flops 363, 364, 365 and 366 are then transmitted to the rotational angle signal output circuit 380 so that a "0" is generated at the output terminal of a NAND gate 381 and also a "0" is generated at the output terminal of a NAND gate 382. Thus, the input signal to a switching circuit comprising resistors 385 and 387 and a transistor 386 goes to the low level and a signal "1" is generated at the output terminal 304 indicating that the first output electrode 151 of the second plate 150 is opposite to the first input rotational angle detection electrode 143 of the first plate 140 (or the second output electrode 152 of the second plate 150 is opposite to the second input rotational angle detection electrode 144 of the first plate 140). At this time, the signal at the output terminal 303 of the reference angular position signal output circuit 370 is "0". On the other hand, when the rotation of the shaft 120 of FIG. 13 rotates the second plate 150 so that its second output electrode 152 is positioned opposite to the first input reference angular position detection electrode 141 of the first plate 140 and its first output electrode 151 is positioned opposite to the second input rotational angle detection electrode 144 of the first plate 140 as shown in FIG. 16b, the signal 20-s applied to the second input rotational angle detection electrode 144 of the first plate 140 is transmitted as a signal 32-s (see (f) of FIG. 17) to the comparison circuit 350 by way of a capacitor comprising the first output electrode 151 of the second plate 150 and the second input rotational angle detection electrode 144 of the first plate 140 and the capacitor comprising the first ring-shaped electrodes 145 and 153 of the first and second plates 140 and 150. Also, the signal 11-s applied to the first input reference angular position detection electrode 141 of the first plate 140 is applied as a signal 33-s (see (f) of FIG. 17) to the comparison circuit 350 by way of a capacitor comprising the second output electrode 152 of the second plate 150 and the first input reference angular position detection electrode 141 of the first plate 140 and the capacitor comprising the second ring-shaped electrodes 146 and 164 of the first and second plates 140 and 150. These signals are differentially amplified by the comparison circuit 350, reshaped through the inverters 357 and 358 and then transmitted as a signal 51-s (see (m) of FIG. 17) to the phase detecting circuit 360. The phase detecting circuit 360 detects the phases of the signal 51-s and the previously mentioned signals 60-s and 70-s so that a "0" is generated at the output terminal 304 of the rotational angle signal output circuit 380. At this time, the signal at the output terminal 303 of the reference angular position signal output circuit 370 remains "0".

Figure 17:
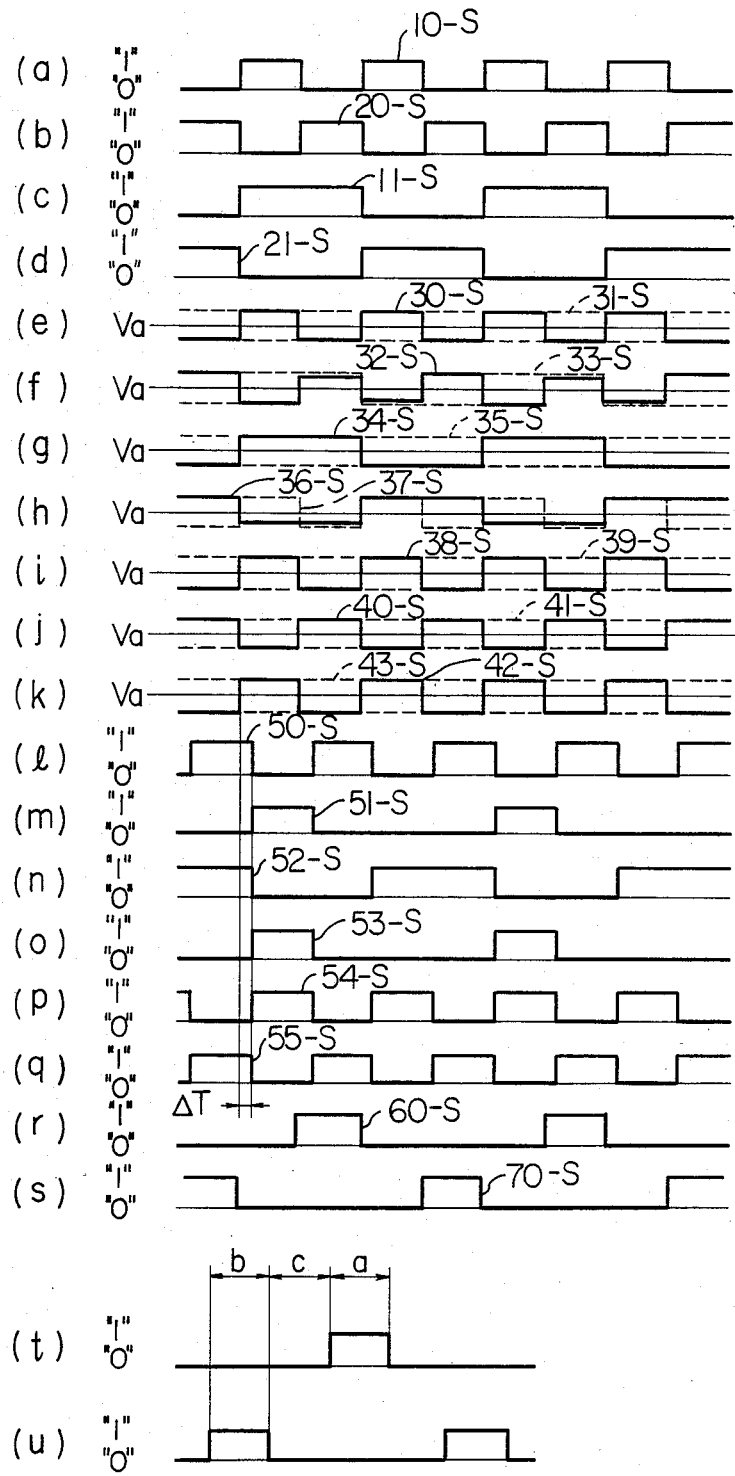
FIGS. 17a–17u shows a plurality of signal waveforms which are useful for explaining the operation of the detecting circuit section shown in FIG. 15.

When the shaft 120 is rotated further so that the first and second output electrodes 151 and 152 of the second plate 150 are respectively positioned opposite to the first and second input reference angular position detection electrodes 141 and 142 of the first plate 140 as shown in FIG. 16c, a signal 34-s (see (g) of FIG. 17) of the same phase as the waveform 11-s applied to the first input reference angular position detection electrode 141 of the first plate 140 is transmitted to the comparison circuit 350 by way of a capacitor comprising the first input reference angular position detection electrode 141 of the first plate 140 and the first output electrode 151 of the second plate 150 and the capacitor comprising the first ring-shaped electrodes 145 and 153 of the first and second plates 140 and 150. Also, a signal 35-s (see (g) of FIG. 17) of the same phase as the waveform 21-s applied to the second reference angular position detection electrode 142 of the first plate 140 is transmitted to the comparison circuit 350 by way of a capacitor comprising the second input reference angular position detection electrode 142 of the first plate 140 and the second output electrode 152 of the second plate 150 and the capacitor comprising the second ring-shaped electrodes 146 and 154 of the first and second plates 140 and 150. The signals 34-s and 35-s are differentially amplified and transmitted as a signal 52-s (see (n) of FIG. 17) to the phase detecting circuit 360. When the signal 52-s is transmitted to the phase detecting circuit 360, the output terminals Q's of the D-type flip-flops 365 and 366 go to "1" and the output terminals Q's of the D-type flip-flops 363 and 364 go to "0". As a result, the output terminal of a NAND gate 374 goes to "0" and the output terminal 303 of the reference angular position output circuit 370 goes to "1". In this case, the rotational angle signal output terminal 304 remains "0".

Then, when the second input reference angular position detection electrode 142 of the first plate 140 and the first output electrode 151 of the second plate 150 are positioned opposite to each other and also the first input rotational angle detection electrode 143 of the first plate 140 and the second output electrode 152 of the second plate 150 are positioned opposite to each other as shown in FIG. 16d, the signal 21-s is transmitted as a signal 36-s as shown in (h) of FIG. 17 to the comparison circuit 350 by way of a capacitor comprising the second input reference angular position detection electrode 142 of the first plate 140 and the first output electroee 151 of the second plate 150 and the capacitor comprising the first ring-shaped electrodes 145 and 153 of the first and second plates 140 and 150. Also, the signal 10-s is transmitted as the signal 37-s shown in (h) of FIG. 17 to the comparison circuit 350 by way of a capacitor comprising the first input electrode 143 of the first plate 140 and the second output electrode 152 of the second plate 150 and the capacitor comprising the second ring-shaped electrodes 146 and 154 of the first and second plates 140 and 150. The signals 36-s and 37-s are differentially amplified by the comparison circuit 350 so that the signal 53-s shown in (0) of FIG. 17 is transmitted to the phase detecting circuit 360 and the output terminal 303 of the reference angular position signal output circuit 370 goes to "0". In this case, the output terminal 304 of the rotational angle signal output circuit 380 remains "0".

When the shaft 120 is rotated further so that the first input rotational angle detection electrode 143 of the first plate 140 and the first output electrode 151 of the second plate 150 are opposite to each other and also the second input rotational angle detection electrode 144 of the first plate 140 and the second output electrode 152 of the second plate 150 are opposite to each other as shown in FIG. 16e, signals 38-s and 39-s are transmitted to the comparison circuit 350 as shown in FIG. 16e. Thus, the output terminal 304 of the rotational angle signal output circuit 380 goes to the "1" level and the output terminal 303 of the reference angular position signal output circuit 370 remains at the "0" level.

When the shaft 120 is rotated further so that the second input electrode 144 of the first plate 140 and the first output electrode 151 of the second plate 150 face each other and also the first input electrode 143 of the first plate 140 and the second output electrode 152 of the second plate 150 face each other as shown in FIG. 16f, the signal 20-s is transmitted as the signal 40-s shown in (j) of FIG. 17 to the comparison circuit 350 by way of a capacitor comprising the second input electrode 144 of the first plate 140 and the first output electrode 151 of the second plate 150 and the capacitor comprising the first ring-shaped electrodes 145 and 153 of the first and second plates 140 and 150. Also, a signal of the same phase as the oscillation waveform 10-s is transmitted as the signal 41-s shown in (j) of FIG. 17 to the comparison circuit 350 by way of a capacitor comprising the first input electrode 143 of the first plate 140 and the second output electrode 152 of the second plate 150 and the capacitor comprising the second ring-shaped electrodes 146 and 154 of the first and second plates 140 and 150. In the comparison circuit 350, these signals 40-s and 41-s are differentially amplified and transmitted as the signal 55-s shown in (q) of FIG. 17 to the phase detecting circuit 360. Thus, the output terminal 304 of the rotational angle signal output circuit 380 goes to "0" and the output terminal 303 of the reference angular position signal output circuit 370 remains "0".

As having been described hereinabove, when the second plate 150 is rotated by the rotation of the shaft 120 so that the first and second reference angular position detection electrodes 141 and 142 and the first and second rotational angle detection electrodes 143 and 144 which are arranged on the first plate 140 and the first and second output electrodes 151 and 152 of the second plate 150 are successively opposed to each other, signals are generated which go to "1" and "0" repeatedly as shown in (t) and (u) of FIG. 17. In (t) of FIG. 17 is shown the output signal at the output terminal 303 of the reference angular position signal output circuit 370 and shown in (u) of FIG. 17 is the output signal at the output terminal 304 of the rotational angle signal output circuit 380. With the waveforms of these output signals, an interval a indicates that the first output electrode 151 of the second plate 150 is positioned opposite to the first input reference angular position detection electrode 141 of the first plate 140 and it indicates the reference angular position which appears once for every rotation of the shaft 120. Intervals b and c respectively indicate that the first output electrode 151 of the second plate 150 is positioned opposite to the first and second rotational angle detection electrodes 143 and 144, respectively, of the first plate 140 and these intervals occur alternately except where the interval a occurs.

While, in the third embodiment described above, the first and second reference angular position electrodes 141 and 142 of the first plate 140 and the first and second output electrodes 151 and 152 of the second plate 150 adapted to face the former electrodes are arranged as shown in FIGS. 14a and 14b, as mentioned in the description of the embodiment, this arrangement only needs to be such that the reference angular position detection electrodes of the first plate 140 and the output electrodes of the second plate 150 face wholly only once for every rotation of the shaft 120 and one electrode piece at the most faces during the remainder of the rotation. In other words, it should be apparent from the foregoing description that the similar effect can be obtained even in extreme cases where the first plate-reference angular position detection electrodes comprise only a pair comprising one of the electrode pieces of 141 and the adjacent one of those of 142 and the second plate-output electrodes comprise only a pair comprising one of the electrode pieces of 151 and the adjacent one of those of 152.

The fourth embodiment of the invention will now be described with reference to the accompanying drawings.

Figure 19A:
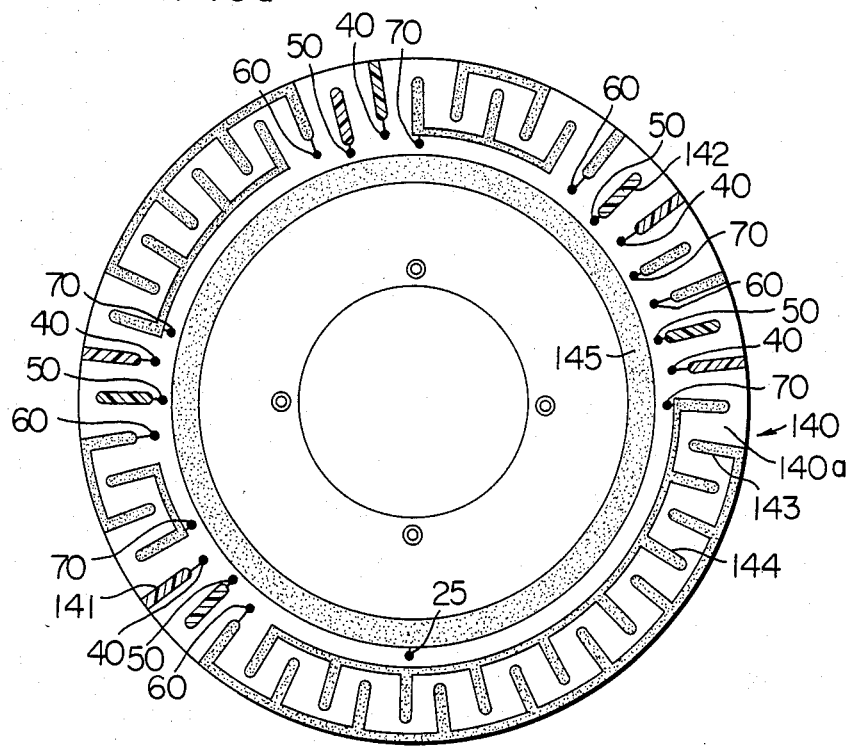
FIGS. 19a and 19b are front views showing the first and second plates used in the apparatus shown in FIG. 18.
Figure 19B:
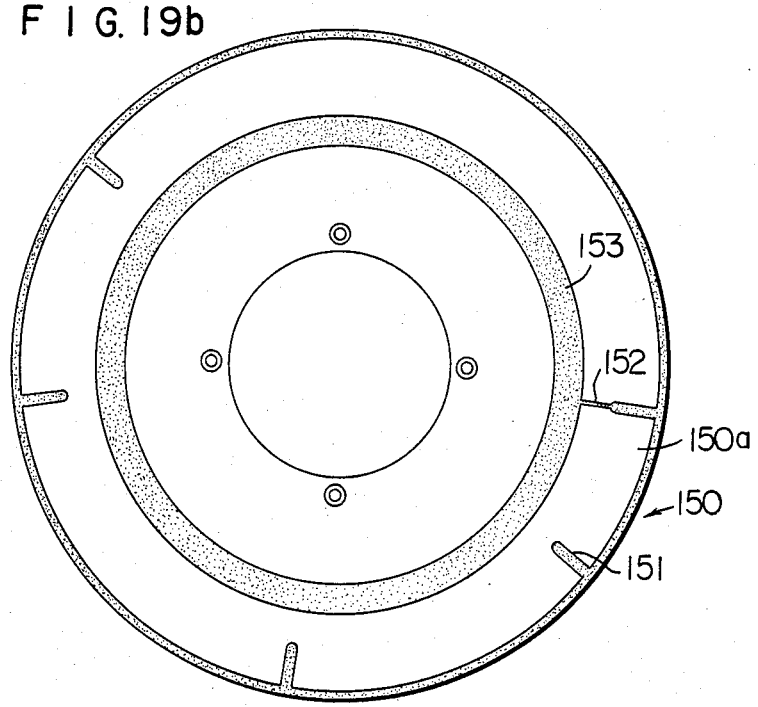

FIG. 18 is a longitudinal sectional view showing the mechanical construction of a capacity type rotation detecting apparatus according to the fourth embodiment of the invention in the like manner as FIG. 1b for the first embodiment and FIG. 13 for the third embodiment. However, this embodiment differs from the first and third embodiments in that the signal lines 141-a, 142-a, 143-a, 144-a and 145-a from the detecting circuit section 101 provided on the printed board 130 attached to the housing 100 are respectively connected to the associated electrodes of the first plate 140. More specifically, in FIG. 19a illustrating a front view showing the surface 140a of the first plate 140 which faces the second plate 150, the signal lines 141-a, 142-a, 143-a, 144-a and 145-a are respectively connected via the connecting points 40, 50, 60, 70 and 25 to the first and second input reference angular position detection electrodes 141 and 142 and first and second input rotational angle detection electrodes 143 and 144, each including a plurality of pectinated electrode pieces, and the ring-shaped electrode 145 of the first plate 140. The first and second input reference angular position detection electrodes 141 and 142 have their electrode pieces arranged at respective different intervals and respectively interconnected on the back surface by way of the connecting points 40 and 50. The first and second input rotational angle detection electrodes 143 and 144 have their electrode pieces radially arranged alternately in those portions where the first and second input reference angular position detection electrodes 141 and 142 are not present and respectively interconnected on the front surface as well as on the back surface by way of the connecting points 60 and 70. FIG. 19b is a front view showing the surface 150a of the second plate 150 which faces the first plate 140 and the output electrode 151 has its electrode pieces interconnected electrically on the front surface and also to the ring-shaped electrode 153 by a lead wire 152. It is arranged so that when the second plate 150 is rotated, the output electrode 151 faces wholly the first and second input reference angular position detection electrodes 141 and 142, respectively, only at one position. The ring-shaped electrode 153 is arranged at a position to be opposite to the ring-shaped electrode 145 of the first plate 140.

Figure 20:
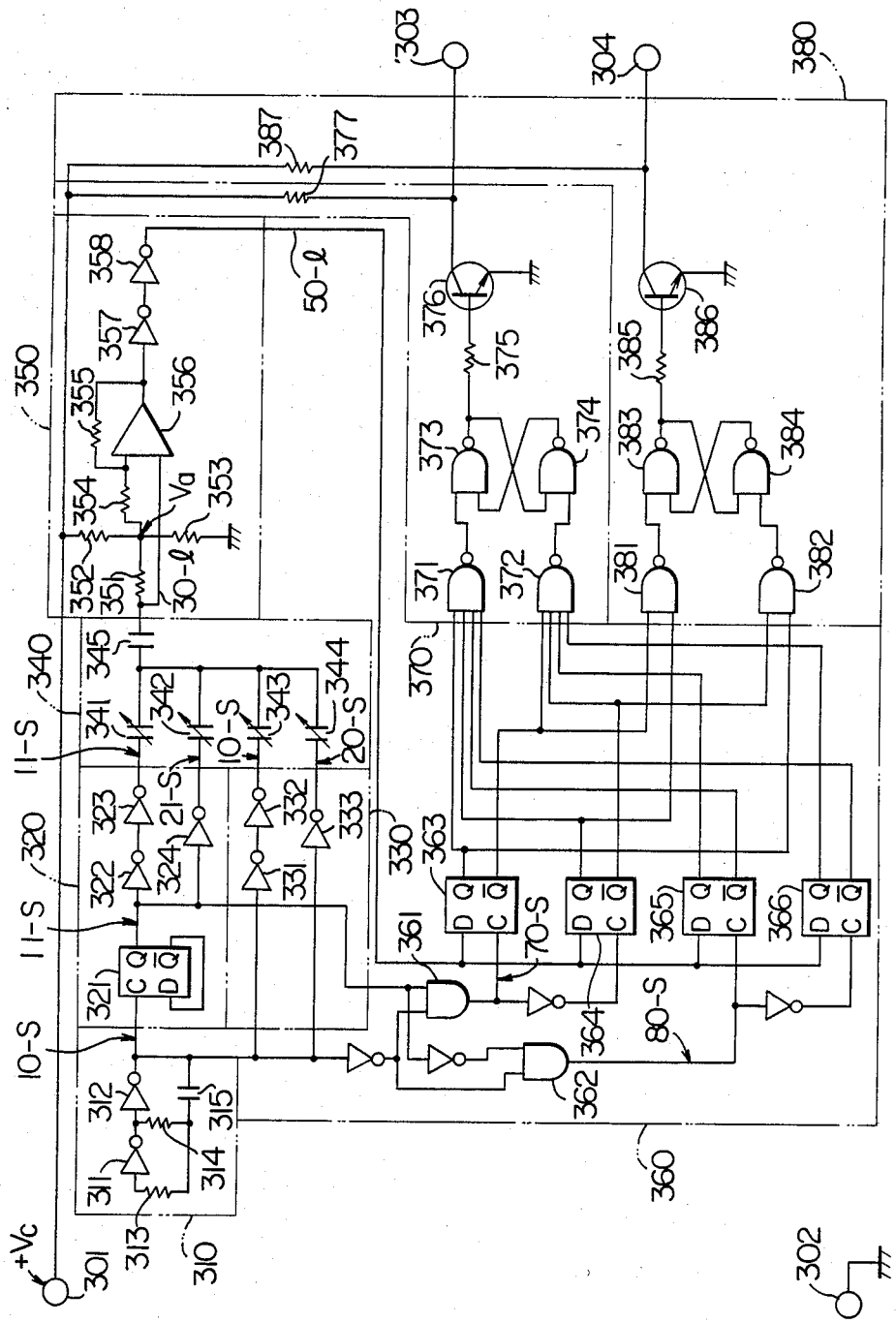
FIG. 20 is a circuit diagram showing an embodiment of the detecting circuit section of the apparatus shown in FIG. 18.

FIG. 20 is a circuit diagram of the detecting circuit section 101 in FIG. 18. In the Figure, a terminal 301 is a power supply terminal to which is applied a constant voltage $+V_C$. A terminal 302 is a ground terminal. Numeral 310 designates a known type of CR oscillator circuit, 320 a first reference signal generating circuit, 330 a second reference signal generating circuit, 340 a capacitor group comprising the electrodes 151 and 153 of the second plate 150 and the electrodes 141, 142, 143, 144 and 145 of the first plate 140, 350 a comparison circuit, 360 a phase detecting circuit, 370 a reference angular position signal output circuit, 380 a rotational angle signal output circuit, 303 a reference angular position signal output terminal, and 304 a rotational angle signal output terminal.

The CR oscillator circuit 310 and the first reference signal generating circuit 320 form a first periodic signal supply circuit, and the CR oscillator circuit 310 and the second reference signal generating circuit 330 form a second periodic signal supply circuit. Also, the comparison circuit 350, the phase detecting circuit 360, the reference angular position signal output circuit 370 and the rotational angle signal output circuit 380 form a detecting circuit.

Next, the operation of the above-described construction will be described with reference to FIGS. 20, 21a to 21d and 22. In FIG. 20, the oscillation waveform 10-s shown in (a) of FIG. 22 is produced by the CR oscillator circuit 310 comprising inverter gates 311 and 312, resistors 313 and 314 and a capacitor 315. This oscillation waveform 10-s is then transmitted to the first reference signal generating circuit 320, and the waveform 11-s in (c) of FIG. 22 obtained by the 2:1 frequency division of the oscillation waveform 10-s and the waveform 21s shown in (d) of FIG. 22, which is opposite in phase to the waveform 11-s, are produced through a D-type flip-flop 321 and inverter gates 322, 323 and 324. The waveform 10-s is also transmitted to the second reference signal generating circuit 330, and a signal of the same phase as the oscillation waveform 10-s and the signal 20-s of the opposite phase shown in (b) of FIG. 22 are produced.

Figure 21A:
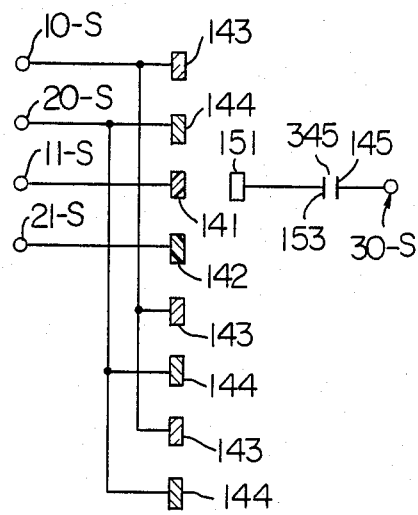
FIGS. 21a to FIG. 21d show respectively the relative positions of the electrodes occurring druing the rotation of the rotational member, which are useful for explaining the operation of the apparatus shown in FIG. 18.

Description will be first made of the case where the shaft 120 is rotated so that the second plate 150 is rotated bringing its output electrode 151 in a position opposite to the first input reference angular position detection electrode 141 of the first plate 140 as shown in FIG. 21a.

In this case, the whole of the output electrode 151 of the second plate 150 is opposite to the first input reference angular position detection electrode 141 of the first plate 140. The signal 11-s obtained by the 2:1 frequency division of the oscillation waveform 10-s is applied through the signal line 141-a to the first input reference angular position detection electrode 141 of the first plate 140 so that a signal of the same phase as the signal 11-s is generated on the lead wire 152 shown in FIG. 14b by way of a capacitor (341 in FIG. 20) comprising the first input reference angular position detection electrode 141 of the first plate 140 and the output electrode 151 of the second plate 150, and the signal is then transmitted as the signal 30-s in (e) of FIG. 22 to a signal line 30-l leading to the comparison circuit 350 of FIG. 20 via the connecting point 25 by a capacitor (345 in FIG. 20) comprising the ring-shaped electrode 153 of the second plate 150 and the ring-shaped electrode 145 of the first plate 140. Note that the waveform of the signal 30-s is biased by a voltage Va determined by resistors 352 and 353 of the comparison circuit 350. The signal 30-s is amplified by an amplifier circuit comprising an operational amplifier 356 (hereinafter simply referred to as an OP AMP) and a resistor 355 of the comparison circuit 350, reshaped by inverter gates 357 and 358 and delivered onto a signal line 50-l in FIG. 20 as a signal 50-s of the waveform shown in (g) of FIG. 22 and delayed by ΔT from the signal 11-s. Here, the delay ΔT represents the capacitor response delay time and the switching delay time of the OP AMP 356.

The signal 50-s is then transmitted to the phase detecting circuit 360 and is applied to the data terminal of its D-type flip-flops 363, 364, 365 and 366, respectively.

Also, the signal 70-s shown in (i) of FIG. 22 is applied to the clock terminal of the D-type flip-flop 363 and a signal of the phase opposite to the signal 70-s is applied to the clock terminal of the D-type flip-flop 364. Also, the signal 80-s shown in (j) of FIG. 22 is applied to the clock terminal of the D-type flip-flop 365 and a signal of the phase opposite to the signal 80-s is applied to the clock terminal of the D-type flip-flop 366. When the above-mentioned signal 50-s is applied to the data terminal of the D-type flip-flops 363, 364, 365 and 366, respectively, a "1" is generated at the output terminal Q of the D-type flip-flops 363 and 364, respectively, and a "0" is generated at the output terminal Q of the D-type flip-flops 365 and 366, respectively. The output signals of the D-type flip-flops 363, 364, 365 and 366 are transmitted to the reference angular position signal output circuit 370 so that a "0" is generated at the output terminal of a NAND gate 371, a "1" at the output terminal of a NAND gate 372 and a "1" at the output terminal of a NAND gate 373, and a switching circuit comprising resistors 375 and 377 and a transistor 376 generates at the output terminal 303 a signal "0" indicating that the output electrode 151 of the second plate 150 is opposite to the first input reference angular position detection electrode 141 of the first plate 140. In this case, the output terminal 304 of the rotational angle signal output circuit 380 is at "0".

Figure 21B:
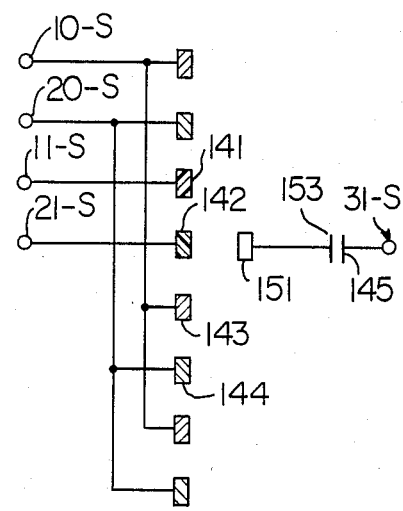

Next, description will be made of the case where the shaft 120 shown in FIG. 18 is rotated so that the second plate 150 is rotated bringing its output electrode 151 in a position opposite to the second input reference angular position detection electrode 142 of the first plate 140 as shown in FIG. 21b. In this case, the whole of the output electrode 151 of the second plate 150 is positioned opposite to the second input reference angular position detection electrode 142 of the first plate 140. A signal 21-s of the phase opposite to the signal 11-s is applied via the signal line 142-a to the second input reference angular position detection electrode 142 of the first plate 140 so that the signal 21-s is transmitted by way of a capacitor (342 in FIG. 20) comprising the electrode pieces of the second input reference angular position detection electrode 142 and the electrode pieces of the output electrode 151 of the second plate 150 and then, as mentioned previously, transmitted as a signal 31-s (see (e) of FIG. 22) to the signal line 30-l leading to the comparison circuit 350. The signal 31-s is amplified by the OP AMP 356 and a signal 51-s (see (g) of FIG. 22) is generated on the signal line 50-l in FIG. 20. Thus, in the like manner as described previously, a "0" is generated at the output terminal Q of the D-type flip-flops 363 and 364, respectively, and a "1" is generated at the output terminal Q of the D-type flip-flops 365 and 366, respectively. As a result, the output terminal of the NAND gate 371 goes to "1" and the output terminal of the NAND gate 372 goes to "0", so that the output terminal of the NAND gate 373 goes to "0" and a signal "1" is generated at the output terminal 303 indicating that the output electrode 151 of the second plate 150 is opposite to the second input reference angular position detection electrode 142 of the first plate 140. In this case, the output terminal 304 of the rotational angle signal output circuit 380 remains "0".

Figure 21C:
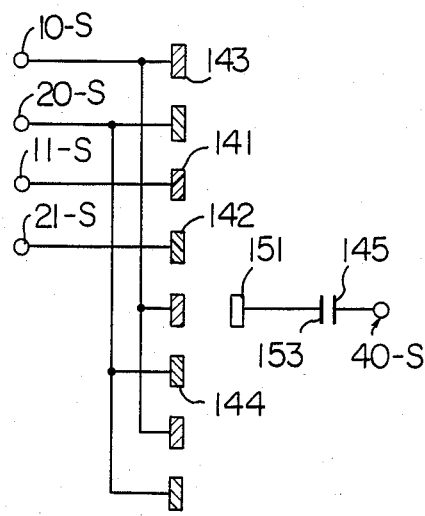

Next, description will be made of the case where the output electrode 151 of the second plate 150 is positioned opposite to the first input rotational angle detection electrode 143 of the first plate 140 as shown in FIG. 21c. A signal of the same phase as the oscillation waveform 10-s is applied to the first input rotational angle detection electrode 143 of the first plate 140 so that the signal 40-s shown in (f) of FIG. 22 is generated on the signal line 30-l by way of a capacitor (343 in FIG. 20) comprising the output electrode 151 of the second plate 150 and the first input rotational angle detection electrode 143 of the first plate 140 and the capacitor (345 in FIG. 20) comprising the ring-shaped electrode 153 of the second plate 150 and the ring-shaped electrode 145 of the first plate 140. This signal 40-s is transmitted to the comparison circuit 350 and thus the signal 60-s shown in (h) of FIG. 22 is generated on the signal line 50-l. The signal 60-s is transmitted to the phase detecting circuit 360 so that a "1" is generated at the output terminal Q of the D-type flip-flop 363 and a "0" is generated at the output terminal Q of the D-type flip-flop 364. Consequently, a "1" is generated at the output terminal of the NAND gate 381 of the rotational angle signal output circuit 380 and a "0" is generated at the output terminal of the NAND gate 382, thus generating a signal "1" at the output terminal 304 of the rotational angle signal output circuit 380 indicating that the output electrode 151 of the second plate 150 is opposite to the first input rotational angle detection electrode 143 of the first plate 140. In this case, a "0" is generated at the output terminal 303.

When the output electrode 151 of the second plate 150 is positioned opposite to the first input rotational angle detection electrode 143 of the first plate 140, depending on the position of the shaft 120, there are cases where some of the electrode pieces of the output electrode 151 may face the first input reference angular position detection electrode 141 of the first plate 141. However, the number of such an electrode piece will be only one at the most and can be ignored.

Figure 21D:
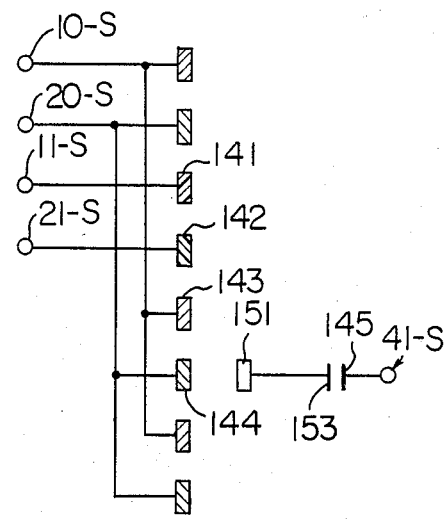

Next, when the output electrode 151 of the second plate 150 is positioned opposite to the second input rotational angle detection electrode 144 of the first plate 140 as shown in FIG. 21d, a signal 41-s (see (f) of FIG. 22) is generated on the signal line 30-l in FIG. 20 so that a signal 61-s (see (h) of FIG. 22) is generated on the signal line 50-l, and a signal "0" is generated at the output terminal 304 of the rotational angle signal output circuit 380 in the same manner, as mentioned previously, indicating that the output electrode 151 of the second plate 150 is opposite to the second input rotational angle detection electrode 144 of the first plate 140. In this case, a "0" is generated at the output terminal 303.

While, when the output electrode 151 of the second plate 150 is positioned opposite to the second input reference angular position electrode 144 of the first plate 140, depending on the rotational position of the shaft 120, one piece at the most of the electrode pieces of the output electrode 151 will face the second input reference angular position detection electrode 142, this can be ignored for the reason as mentioned previously.

As described hereinabove, when the second plate 150 is rotated by the rotation of the shaft 120 so that the first and second reference angular position detection electrodes 141 and 142 and the first and second rotational angle detection electrodes 143 and 144, which are arranged on the first plate 140, successively face the output electrode 151 of the second plate 150, signals are generated as shown in (a) and (b) of FIG. 23, and, in (b) of FIG. 23 the interval, a is a time during which the output electrode 151 of the second plate 150 is positioned opposite to the second input reference angular position detection electrode 142 of the first plate 140 and the interval a appears once for every rotation of the shaft 120. The intervals b and c respectively indicate times during which the output electrode 151 of the second plate 150 is positioned opposite to the first input rotational angle detection electrode 143 and the second input rotational angle detection electrode 144, respectively, of the first plate 140.

While, in the above-described fourth embodiment, the first and second input reference angular position detection electrodes 141 and 142 of the first plate 140 and the output electrode 151 of the second plate 150, which is adapted to face the former electrodes, are arranged as shown in FIGS. 19a and 19b, as also mentioned in the description of the embodiment, the arrangement needs only to be such that the reference angular position detection electrodes of the first plate 140 and the output electrode of the second plate 150 face each other wholly once for every rotation of the shaft 120 and only one electrode piece thereof at the most is allowed to face during the remainder of the rotation. In other words, the similar effect as mentioned previously can be obtained even in such an extreme case where the first plate-reference angular position detection electrodes comprise only a pair comprising one of the electrode pieces of 141 and the adjacent one of those of 142 and the second plate-output electrode comprises only a single electrode piece.

From the foregoing description it will be seen that the capacity type rotation detecting apparatus according to this invention has a great advantage that the rotational angle and reference angular position of a rotational object under measurement can be accurately detected simultaneously by one and the same apparatus irrespective of the rotational speed of the rotational object under measurement.

We claim:

1. A capacitive-type incremental rotational position and reference angular position detecting apparatus, comprising:
   a stationary part;
   a rotational part;
   a first plate, mounted on said stationary part, having first and second first-input electrodes, each including a plurality of electrode pieces, said electrode pieces being arranged around a circumference of said first plate at respective equal intervals and contiguously intermeshed, and said first plate having third and fourth semi-circular second-input electrodes arranged around said circumference;
   a second plate, mounted on said rotational part and facing said first plate, having first-output electrode means including a plurality of electrode pieces arranged along a circumference of said second plate at equal intervals facing said electrode pieces of said first-input electrodes of said first plate, and said second plate having second-output electrode means facing said second-input electrodes of said first plate;
   a periodic signal supply circuit for supplying two periodic signals of predetermined period and opposite phase respectively to said first-input electrodes and to said second-input electrodes;
   signal transmission means for transmitting signals between said first plate and said second plate;
   an incremental rotational position signal generating circuit means for detecting incremental rotation of said second plate by detecting the phase relation between periodic signals output by said first-output electrode means and the periodic signals supplied by said periodic signal supply circuit; and a reference angular position signal generating circuit means for detecting reference angular position of said second plate by detecting the phase relation between periodic signals output by said second-output electrode means and the periodic signals supplied by said periodic signal supply circuit.

2. An apparatus according to claim 1, wherein said first-output electrode means comprises first and second electrodes, each comprising a plurality of electrode pieces, said electrode pieces being contiguously intermeshed;

said second-output electrode means comprises a pair of third and fourth electrodes;

said incremental rotational position signal generating circuit means comprises first comparison circuit means for detecting the difference between periodic signals output on said first-output first and second electrodes to generate an output signal, first phase detecting circuit means for detecting the phase of said first comparison circuit means output signal as compared with the periodic signals from said periodic signal supply circuit, and incremental indication means for generating an incremental rotational position signal whenever the detected phase of said first comparison circuit means output signal reverses; and said reference angular position signal generating circuit means comprises second comparison circuit means for detecting the difference between periodic signals output on said second-output third and fourth electrodes to generate an output signal, second phase detecting circuit means for detecting the phase of said second comparison circuit means output signal as compared with the periodic signals from said periodic signal supply circuit, and reference angular indication means for generating a reference angular position signal whenever the detected phase of said second comparison circuit means output signal from said reverses.

3. An apparatus according to claim 1, wherein said first-output electrode means comprises a single electrode arranged around a circumference of said second plate;

said second-output electrode means comprises a single electrode;

said incremental rotational position signal generating circuit means comprises first comparison circuit means for comparing a periodic signal output on said first-output electrodes with a reference signal of a first predetermined level to generate an output signal, first phase detecting circuit for detecting the phase of said output signal from said first comparison circuit as compared with the periodic signals from said periodic signal supply circuit, and incremental indication means for generating an incremental rotational position signal whenever the detected phase of said output signal from said first comparison circuit reverses; and said reference angular position signal generating circuit means comprises second comparison circuit means for comparing a periodic signal output on said second-output electrodes with a reference signal of a second predetermined level to generate an output signal, second phase detecting circuit for detecting the phase of said output signal from said second comparison circuit as compared with the periodic signals from said periodic signal supply circuit, and reference angular indication means for generating a reference angular position signal whenever the detected phase of said output signal from said second comparison circuit reverses.

4. An apparatus according to any one of claims 1, 2 or 3, wherein said signal transmission means comprises ring-shaped signal transmission electrodes arranged on each of said first and second plates to face each other, with the transmission of signals effected without physical contact through capacitance formed between said signal transmission electrodes on said respective first and second plates.

* * * * *